US012453628B2

(12) United States Patent
Sales et al.

(10) Patent No.: US 12,453,628 B2
(45) Date of Patent: Oct. 28, 2025

(54) TEMPORARY SYNTHETIC CARRIER FOR CORNEAL TISSUE INSERTION AND TISSUE DELIVERY

(71) Applicant: Cornell University, Ithaca, NY (US)

(72) Inventors: Christopher Sales, New York, NY (US); David Putnam, New York, NY (US)

(73) Assignee: Cornell University, Ithaca, NY (US)

( * ) Notice: Subject to any disclaimer, the term of this patent is extended or adjusted under 35 U.S.C. 154(b) by 868 days.

(21) Appl. No.: 17/609,231

(22) PCT Filed: May 6, 2020

(86) PCT No.: PCT/US2020/031673
§ 371 (c)(1),
(2) Date: Nov. 5, 2021

(87) PCT Pub. No.: WO2020/227407
PCT Pub. Date: Nov. 12, 2020

(65) Prior Publication Data
US 2022/0354633 A1 Nov. 10, 2022

Related U.S. Application Data

(60) Provisional application No. 62/876,390, filed on Jul. 19, 2019, provisional application No. 62/844,710, filed on May 7, 2019.

(51) Int. Cl.
*A61F 2/14* (2006.01)
*A61L 27/18* (2006.01)
(Continued)

(52) U.S. Cl.
CPC .............. *A61F 2/142* (2013.01); *A61L 27/18* (2013.01); *A61L 27/20* (2013.01); *A61L 27/26* (2013.01);
(Continued)

(58) Field of Classification Search
CPC .. A61F 2/142; A61F 2210/0076; A61F 2/148; A61F 2/145; A61L 27/3604; A61L 27/3666; A61L 2430/16; A61L 27/3808
See application file for complete search history.

(56) References Cited

U.S. PATENT DOCUMENTS

2006/0094643 A1* 5/2006 Svirkin ............... A61K 47/186
514/310
2008/0286336 A1* 11/2008 Shiah ................... A61F 9/0017
623/6.56
(Continued)

OTHER PUBLICATIONS

Cullen, "Photobiology of the Cornea," Sep. 22, 2011 (Sep. 22, 2011), retrieved on Aug. 28, 2020 from <http://photobiology.info/Cullen.html>.
(Continued)

*Primary Examiner* — Jerrah Edwards
*Assistant Examiner* — Kia Xiong White
(74) *Attorney, Agent, or Firm* — Foley & Lardner LLP

(57) ABSTRACT

The present solution can temporarily impart the handling characteristics of corneal stroma to the otherwise very thin, flimsy, coiling, and fragile Descemet membrane endothelial keratoplasty (DMEK) tissue during its insertion into the anterior chamber and positioning in apposition against the cornea of the recipient eye. The device of the present solution can be configured in a number of ways. In a first configuration, a scaffold can be coupled with the endothelial side of the DMEK graft. In a second configuration, the scaffold can be coupled with the stromal side of the DMEK graft. In a third configuration, one or more scaffolds can be coupled with both the endothelial and stromal side of the DMEK graft.

19 Claims, 19 Drawing Sheets

(51) Int. Cl.
  *A61L 27/20*    (2006.01)
  *A61L 27/26*    (2006.01)
  *A61L 27/36*    (2006.01)
  *A61L 27/58*    (2006.01)

(52) U.S. Cl.
  CPC ....... *A61L 27/3604* (2013.01); *A61L 27/3666* (2013.01); *A61L 27/58* (2013.01); *A61F 2210/0076* (2013.01); *A61F 2250/0031* (2013.01); *A61F 2250/0059* (2013.01); *A61L 2430/16* (2013.01)

(56) References Cited

U.S. PATENT DOCUMENTS

| | | | |
|---|---|---|---|
| 2009/0222086 A1* | 9/2009 | Lui | C12N 5/0068 |
| | | | 424/428 |
| 2013/0085567 A1* | 4/2013 | Tan | A61F 2/148 |
| | | | 623/5.12 |
| 2013/0116799 A1* | 5/2013 | Derwin | A61L 27/38 |
| | | | 623/23.72 |
| 2016/0270904 A1 | 9/2016 | Neusidl | |
| 2018/0106704 A1* | 4/2018 | Tran | G01N 1/28 |
| 2019/0054209 A1* | 2/2019 | Chien | A61L 27/52 |

OTHER PUBLICATIONS

International Preliminary Report on Patentability on PCT PCT/US2020/031673 dated Nov. 18, 2021.
International Search Report and Written Opinion on PCT PCT/US2020/031673 dated Jul. 31, 2020.

* cited by examiner

TEMPORARY SYNTHETIC CARRIER FOR CORNEAL TISSUE INSERTION AND TISSUE DELIVERY

CROSS REFERENCE TO RELATED APPLICATION

This application is a U.S. National Phase Application under 35 U.S.C. § 371 of International Application No. PCT/US2020/031673, filed on May 6, 2020, which claims priority to U.S. Provisional Patent Application No. 62/844,710 entitled "TEMPORARY SYNTHETIC CARRIER FOR CORNEAL TISSUE INSERTION AND TISSUE DELIVERY," filed May 7, 2019, and to U.S. Provisional Patent Application No. 62/876,390 entitled "REPLACING DSAEK STROMA WITH A NOVEL BIOMATERIAL HYDROGEL TO SERVE AS A TEMPORARY ENDOTHELIAL-SIDE SCAFFOLD FOR SCROLL-LESS, DESKILLED DMEK SURGERY," filed Jul. 19, 2019, incorporated herein by reference in their entireties.

STATEMENT REGARDING FEDERALLY SPONSORED RESEARCH

This invention was made with government support under Grant No. TR002384 awarded by the National Institutes of Health. The government has certain rights in the invention.

BACKGROUND OF THE DISCLOSURE

This disclosure relates to generally to regenerative medicine, and more specifically to medical devices and methods pertaining to the eye and body, with applications to corneal ophthalmology.

The cornea is comprised of three primary layers, including a non-regenerating endothelial cell layer that pumps fluid out of the cornea's stromal layer. The endothelial cell layer and the basement membrane that it resides on, known as Descemet's Membrane, are collectively referred to as the endothelium. The most common indication for vision-restoring corneal transplant surgery in the United States is failure of the cornea's endothelial cell layer, which maintains the cornea's clear optical properties. Selective replacement of the endothelial cell layer, a procedure broadly referred to as endothelial keratoplasty, eclipsed century-old full-thickness corneal transplantation as the standard of care in 2011.

Endothelial keratoplasty has been the most commonly performed corneal transplant procedure in the United States since 2011. The underlying principles of endothelial keratoplasty that distinguish it from conventional full-thickness penetrating keratoplasty are twofold: 1) endothelial keratoplasty selectively replaces the dysfunctional endothelium rather than all three layers of the cornea, and 2) endothelial keratoplasty eliminates corneal anchoring sutures by injecting a temporary gas bubble into the eye to support the tissue until its intrinsic water-pumping action "sucks" it into place. Almost two decades of collective advancements made by corneal surgeons around the world has evolved endothelial keratoplasty from an additive procedure into a 1:1 exchanging procedure.

Descemet Stripping Automated Endothelial Keratoplasty (DSAEK) surgery came to the fore between 2000 and 2006. DSAEK replaces diseased endothelium with a corneal graft comprised of, on average, a 130 µm layer of partial thickness donor stroma in addition to donor endothelium. Descemet Membrane Endothelial Keratoplasty (DMEK) was introduced in 2006 but only began to capture surgeon's interest between 2012-2015. DMEK surgery restores normal anatomy by exchanging diseased endothelium for an endothelial-only corneal graft. Randomized controlled studies have shown that DMEK, the more advanced form of endothelial keratoplasty, which replaces the patient's 10 µm corneal endothelial layer with an anatomically-correct 10 µm layer of donor endothelium, is clinically superior to its predecessor, DSAEK, which replaces the patient's endothelium with a thicker 130 µm donor layer comprised of endothelium and redundant corneal stroma.

Despite its clinical superiority, adoption of DMEK has lagged behind DSAEK because the tissue requires a highly technical procedure that's challenging to learn; DMEK surgery requires a specialized technique acquired through intensive training and a lengthy learning curve. The DMEK tissue can roll upon itself making it difficult to implant the DMEK tissue. Additionally, the fragility of the DMEK tissue can make it difficult to handle. DSAEK tissue, by comparison, accommodates multiple surgical approaches with shorter learning curves.

SUMMARY OF THE DISCLOSURE

Various embodiments are capable of delivering the most fragile of human tissues into patients: corneal endothelial cells. In various embodiments, the disclosed approach may temporarily impart the handling characteristics of corneal stroma to the otherwise very thin, flimsy, coiling, and fragile DMEK tissue during its insertion into the anterior chamber and positioning in apposition against the cornea of the recipient eye. Various embodiments include a device that may be configured in a number of ways. In a first potential configuration, a scaffold may be coupled with the endothelial side of the DMEK graft. In a second potential configuration, the scaffold may be coupled with the stromal side of the DMEK graft. In a third potential configuration, one or more scaffolds may be coupled with both the endothelial and stromal side of the DMEK graft. The device may be between, for example, about 50 microns and about 200 microns in thickness in various embodiments. The device may be biocompatible with the human cellular membrane and human intraocular milieu. The device may, for example, be resistant to tearing and shearing forces, be pliable, have memory in a contour, and/or be cuttable into shapes by a surgeon and/or eye bank with, for example, a corneal trephine or corneal punch after being brought into apposition with the DMEK graft outside of the eye prior to tissue insertion.

Various embodiments include a device that can carry the DMEK graft into the eye by way of a wide range of existing tissue insertion approaches used for DSAEK surgery. Once the graft and scaffold are in place, the scaffold may be either biochemically dissolved by hydrolysis, enzymatic action, or temperature-dependent action, mechanically removed, or both biochemically dissolved and mechanically removed, leaving behind only the DMEK graft apposed against the subject's stroma with a bubble tamponade in the anterior chamber of the eye. In various embodiments, the scaffold may be used as a scaffold onto which endothelial cells or other cell cultures can be grown and on which they can then be transported and delivered into the in vivo milieu of choice, ocular and otherwise. In potential embodiments, a device can include polysaccharides, modified polysaccharides, and biocompatible synthetic polymers.

In various embodiments, a synthetic stromal scaffold (SSS) comprised of a hydrogel biomaterial is provided, which transforms the scrolling tendencies of DMEK tissue to make it behave more like DSAEK tissue intraoperatively in an ex-vivo human surgical laboratory model. In various embodiments, a device (e.g., about 100 µm or less in thickness) features endothelial biocompatibility, water-solubility, and surgical viability.

A critical unmet need was a device that deskills DMEK surgery by making it effectively procedurally equivalent to DSAEK so that a DSAEK surgeon can perform DMEK. In various embodiments, a biodegradable device mimics the properties of corneal stroma and can serve as a temporary structural scaffold for DMEK tissue, and in turn, can be used to deliver a wide range of fragile tissues elsewhere in the eye and body.

In a first aspect, various embodiments of the disclosure relate to an endothelial keratoplasty device. The device may comprise a Descemet membrane endothelial tissue layer and a synthetic scaffold. The synthetic scaffold may be adhered or otherwise coupled to the Descemet membrane endothelial tissue layer. The synthetic scaffold may prevent or otherwise reduce spontaneous scrolling of the Descemet membrane endothelial tissue layer in an aqueous environment.

In various embodiments, spontaneous scrolling may be prevented or otherwise reduced via, for example, adhesion of the synthetic scaffold to the Descemet membrane endothelial tissue layer such that the synthetic scaffold-Descemet membrane endothelial tissue layer complex effectively behaves as a single unit, thereby transferring recoil properties of the synthetic scaffold to the Descemet membrane endothelial tissue layer.

In various embodiments, other parameters may additionally or alternatively prevent or otherwise reduce scrolling, such as a synthetic scaffold with a chemical composition that imparts, for example, a Young's modulus of elasticity (ME) approximating that of human corneal stromal tissue.

In various embodiments, the synthetic scaffold may be temporary. The synthetic scaffold may be, for example, biochemically dissolved (e.g., through hydrolysis) and/or mechanically removed.

In various embodiments, the synthetic scaffold may have a thickness that is no greater than 100 microns. The Descemet membrane endothelial tissue layer and the synthetic scaffold may have a combined thickness that is 100-150 microns. The synthetic scaffold may, in various embodiments, have a thickness that is no greater than 100 microns.

In various embodiments, the synthetic scaffold may comprise one or more of carboxymethylcellulose (CMC), polyethylene glycol (PEG), and/or hyaluronic acid (HA). In various embodiments, the synthetic scaffold may additionally or alternatively comprise various combinations of CMC, PEG, HA, starch, dextran, alginate, and/or other compounds in varying proportions.

In various embodiments, the synthetic scaffold may comprise CMC, PEG, and HA. In various embodiments, the synthetic scaffold may comprise a first layer comprising CMC, PEG, and/or HA in varying proportions, and a second (surface) layer comprising HA (e.g., 100% HA, at least 90% HA, or at least 50% HA). In various embodiments, the first layer may comprise CMC, PEG, and/or HA in various proportions. In various embodiments, the first layer may comprise mostly (i.e., at least 50%) or substantially (e.g., at least 90% or at least 95%) CMC, PEG, and/or HA, with other compounds incorporated as part of the remaining up to 50%, remaining up to 10%, remaining up to 5%, etc.

In various embodiments, the surface layer, whatever its composition, may be biocompatible with corneal endothelial cells.

In various embodiments, the synthetic scaffold may be monolayer or bilayer. In various embodiments, the synthetic scaffold may have more than two layers (e.g., 3, 4, or 5 layers).

In various embodiments, the synthetic scaffold may be biochemically dissolvable via hydrolysis, enzymatic action, and/or temperature-dependent action.

In various embodiments, the synthetic scaffold may comprise a layer adhered to an endothelial-cell-side of the Descemet membrane endothelial tissue layer.

In various embodiments, the synthetic scaffold may comprise a layer adhered to a Descemet-membrane-side of the Descemet membrane endothelial tissue layer.

In various embodiments, the synthetic scaffold may comprise a first layer adhered to an endothelial-cell-side of the Descemet membrane endothelial tissue layer and a second layer adhered to a Descemet-membrane-side of the Descemet membrane endothelial tissue layer.

In various embodiments, the first layer may comprise carboxymethylcellulose (CMC) and polyethylene glycol (PEG), and the second layer may comprise hyaluronic acid (HA). In various embodiments, the first layer may further comprise HA. In various embodiments, the first layer may comprise CMC, PEG, and HA, and wherein the second layer may comprise HA.

In another aspect, various other embodiments also relate to an endothelial keratoplasty device. The device may comprise a Descemet membrane endothelial keratoplasty (DMEK) tissue layer and a temporary synthetic stromal scaffold (SSS) coupled to the DMEK tissue layer. The DMEK tissue layer and the SSS may have a combined thickness that is no greater than 150 microns.

In various embodiments, the SSS prevents spontaneous scrolling of the DMEK tissue layer in an aqueous environment.

In various embodiments, the SSS is coupled to a Descemet-membrane-side of the DMEK tissue layer.

In another aspect, various embodiments relate to a method of performing Descemet Membrane Endothelial Keratoplasty (DMEK) on a cornea of an eye of a subject using an endothelial keratoplasty device. The endothelial keratoplasty device may comprise a Descemet membrane endothelial tissue layer and a synthetic scaffold adhered to the Descemet membrane endothelial tissue layer. The synthetic scaffold may prevent or otherwise reduce spontaneous scrolling of the Descemet membrane endothelial tissue layer in an aqueous environment.

In various embodiments, the DMEK method may be performed using a Descemet Stripping Automated Endothelial Keratoplasty (DSAEK) tool or technique.

In various embodiments, the method may comprise injecting a gas into the eye. The gas may be injected so as to form a bubble tamponade that holds the endothelial keratoplasty device in place in the eye (i.e., apposition against the cornea of the eye).

In various embodiments, the method may comprise dissolving the synthetic scaffold.

In various embodiments, the method may comprise mechanically removing the synthetic scaffold.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7A: Both the DMEK and SSS-1 are grasped between the jaws of the forceps to move them as a complex because adherence of the material to the DMEK tissue may be insufficient for the graft to be indirectly moved by grasping only the synthetic disc. FIGS. 7B and 7C: The DMEK-SSS-1 complex can be pulled into a simulated anterior chamber with micro-forceps through a 5 millimeter (mm) corneal incision. FIG. 7D: Upon exposure to the fluid-filled milieu of a simulated anterior chamber, the DMEK graft spontaneously separates from the SSS-1 and curls into an endothelium-out scroll conformation (in this case, a double scroll).

FIG. 8A, Experiment 2: hydrogel comprised predominantly of hyaluronic acid cannot be grasped with forceps, which cheese-wire through the material after it is hydrated; since the material cannot be pulled into a simulated anterior chamber, adhesion to the DMEK tissue was tested by immersing the DMEK-SSS-2 complex in a bath of balanced salt solution. The DMEK remained adherent to the material, which remained in a planar configuration. FIG. 8B: Once pulled into the anterior chamber, the SSS-1 spontaneously unfolded; the DMEK graft remained adherent to the scaffold and mostly open. Where the viscoelastic was squeezed out of the interface by the peripheral margins of the incision, graft adherence to the scaffold was not as strong but still sufficient to prevent it from curling into a scroll (chevrons). FIG. 8C: Standard sweeping maneuvers used in DSAEK procedures (no tapping required) are used to resolve residual wrinkles in the DMEK graft. FIG. 8D: Post-operative optical coherence tomography (OCT) reveals the DMEK graft lifted into position against the recipient stroma (arrow head) by the hyaluronic acid layer (chevron), the SSS-1 hydrogel (asterisk), and an air bubble (diamond).

FIG. 9: Characterization of the hydrogel's chemistry and physical properties.

FIG. 10A: Two pieces of the same bi-layer composite (CMC-PEG-HA+HA bilayer, where "CMC" refers to carboxymethylcellulose, PEG refers to polyethylene glycol, and HA refers to hyaluronic acid) is placed onto the endothelium of a human cornea mounted on an artificial anterior chamber. On one hemisphere, the CMC-PEG-HA side is laid onto the endothelium. On the opposing hemisphere, the HA layer is laid onto the endothelium. FIG. 10B: An optical coherence tomography (OCT) image of the cornea in FIG. 10A showing that the materials are fully apposed against the endothelium. FIG. 10C: The central 8.0 mm diameter region of the test cornea stained with Calcein-AM vital dye and segmented using computer trained software (FIJI-segmentation) to quantify the total amount of endothelial cell loss (ECL, red areas) in each hemisphere. The majority of the cell loss observed with the HA sample is confined to the edge of the test material and that there is no cell death where the center of the test article came into contact with the endothelium.

DETAILED DESCRIPTION

Figure 1B:
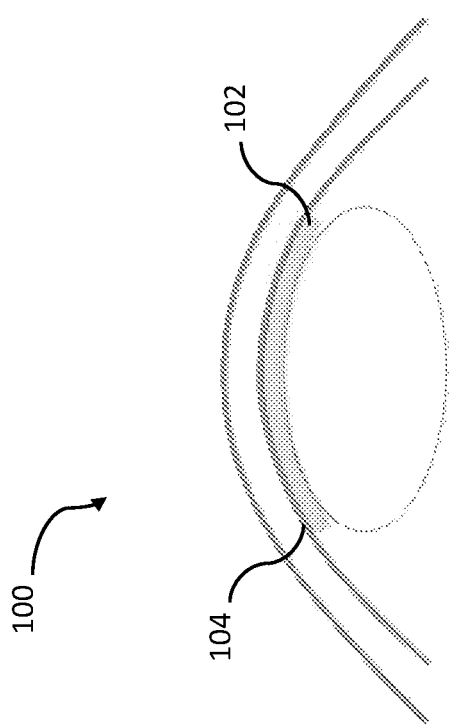
FIGS. 1A and 1B illustrate example device including a scaffold and DMEK tissue according to various potential embodiments.

The various concepts introduced above and discussed in greater detail below may be implemented in any of numerous ways, as the described concepts are not limited to any particular manner of implementation. Examples of specific implementations and applications are provided primarily for illustrative purposes.

Randomized controlled studies show that DMEK is superior to DSAEK with regard to visual outcomes and rejection risk. Despite a growing body of evidence to support its superior visual outcomes and lower risk of rejection compared to DSAEK, DMEK comprises only 35% of all endothelial keratoplasties performed in the United States. In a recent 5-year span, 22.5K DSAEK transplants have been performed in the United States annually, whereas about 11K DMEK transplants have been performed in 2018, up from 5K in 2015, and about 1K in 2012. The slow adoption of DMEK is due to the tissue's fragility and propensity to scroll-up like wrapping paper with the graft's easily damaged endothelial cells, quite inconveniently, on the outside of the scroll. The nature of DMEK tissue leads to a highly specialized, unique surgery that is reproducible, but very challenging to adopt in the absence of intensive training. The extremely thin nature of DMEK tissue imparts its superior clinical profile, but the absence of a stromal scaffold also renders it difficult to manipulate due to the following handling characteristics: 1) Fragility—it requires a "No-Touch" surgical technique; 2) Spontaneous curling into an endothelial-out scroll—it is challenging to unscroll the tissue without touching it.

At least within the U.S., the tenor surrounding surgeons' conversations about DMEK is defined by the difficulty of the procedure, perceived or otherwise. With the advent of eye bank-prepared tissue, now even with pre-loaded DMEK tissue, the difficulty of DMEK graft preparation and the hazard of tissue wastage are mostly moot. What remains challenging are the maneuvers needed to coax a DMEK graft into the appropriate configuration and position once it is in the eye. This is especially true for surgeons adopting the pervasive chamber-shallowing, no-touch, endothelial-side-out technique with the use of tapping or bubble maneuvers to open the graft. But it is also true for surgeons learning variants of the pull-through endothelial-side-in technique.

DSAEK, by comparison, is a much more adaptable procedure because of the nature of the tissue, which has an additional stromal layer that imparts its key attributes of thickness & strength, flexibility, and shape memory. Unlike DMEK tissue, DSAEK tissue can be directly manipulated with forceps because its stromal layer enables it to be rolled or taco-folded such that its endothelial cells are inward facing and its stroma is outward facing, all without ever directly touching the endothelium. With a stromal cushion protecting the endothelium from forceps, rolled or folded DSAEK tissue can be delivered into the eye through a small incision by simple physical manipulation. Once inside the eye, DSAEK tissue tends to spontaneously recoil from a roll or taco into a flat disc, which obviates any need to "unscroll" the tissue. In summary, DSAEK tissue is easy to manipulate because of its: 1) thickness and strength—it can be grasped with forceps without tearing the tissue or crushing the endothelium; 2) flexibility—it can be rolled or folded to fit through a small incision; 3) shape memory—it spontaneously flattens into a disc once it is in the eye. The forgiving nature of DSAEK tissue has yielded multiple surgical approaches and successful medical devices. DSAEK tissue delivery techniques are efficacious, and in general, surgeons gravitate to the approach that suits them, which is why so many different methods have endured for over a decade.

DMEK surgery can require a specialized technique acquired through intensive training and a lengthy learning curve. Increasing the ease of the implantation surgery can increase the adoption of DMEK. Various embodiments can take advantage of surgeons' widespread adoption of DSAEK and its myriad techniques by making DMEK surgery procedurally equivalent to DSAEK surgery in its execution. Surgeons familiar with DSAEK could therefore perform DMEK surgery without learning a new technique. Various embodiments reversibly modify DMEK tissue to make the DMEK tissue mimic the properties of DSAEK tissue by coupling the DMEK tissue with a stroma-like synthetic scaffold. The synthetic biomaterial of various embodiments of the device can impart the characteristics of a DSAEK graft to a DMEK graft. For example, embodiments of the device can impart thickness and strength to the DMEK tissue to render the DMEK tissue touchable by providing a cushion to the endothelium. Embodiments of the device can be flexible to permit rolling and folding of the scaffold-DMEK complex so that it can fit through a small incision. Embodiments of the device can impart memory to the DMEK tissue to permit recoil of the scaffold-DMEK complex back into a flat disc and thereby obviate the need for "unscrolling" maneuvers.

Figure 1A:
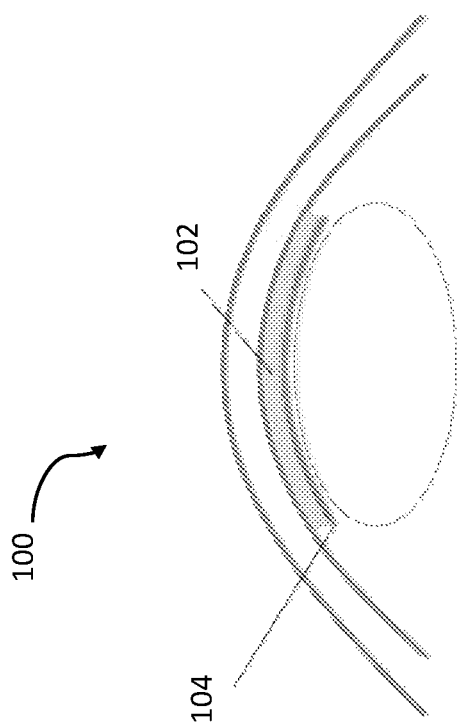

FIGS. 1A and 1B illustrate example implementations of the device 100. In various embodiments, the device can include a scaffold 102 and DMEK tissue 104. The DMEK tissue 104 can include a Descemet-membrane-interface-side and an endothelial-cell-side. As illustrated in FIG. 1A, the scaffold 102 can be coupled with the Descemet-membrane-interface-side. As illustrated in FIG. 1B, the scaffold 102 can be coupled with the endothelial-cell-side of the DMEK tissue 104. In some implementations, the device 100 can include two scaffolds 102: a first coupled to the Descemet-membrane-interface-side and a second coupled to an endothelial-cell-side of the DMEK tissue 104. In some implementations, a single scaffold 102 can be wrapped over one or more edges of the DMEK tissue 104 to couple to both the Descemet-membrane-interface-side and an endothelial-cell-side of the DMEK tissue 104. In some implementations, the device 100 can be configured as a donut variant where the perimeter of the scaffold 102 extends beyond the perimeter of the DMEK tissue 104. For example, the scaffold 102 can have a circular shape with a diameter between about 15 mm and about 20 mm and the scaffold 102 can have a circular shape with a diameter between about 2 mm and about 5 mm.

The scaffold 102 can be a synthetic stromal scaffold. In various embodiments, the device 100 or the scaffold 102 can be between about 25 microns and about 500 microns, between about 50 microns and about 400 microns, between about 50 microns and about 300 microns, or between about 50 microns and about 200 microns. The scaffold 102 can be biocompatible with the human cellular membrane and human intraocular milieu. The scaffold 102 can be resistant to tearing and shearing forces. The scaffold 102 can be pliable. The scaffold 102 can have a shape memory to enable the device 100 to be spontaneously unrolled. In various embodiments, after implantation, the scaffold 102 can be biochemically dissolved by hydrolysis, enzymatic action, and/or temperature-dependent action. In various embodiments, the scaffold 102 can, alternatively or additionally, be mechanically removed (e.g., with forceps). In various embodiments, the scaffold 102 can be both biochemically dissolved and mechanically removed. In various embodiments, the scaffold 102 can dissolve over time in the intraocular milieu. In various embodiments, the scaffold 102 can be used as a cellular scaffold onto which endothelial cells or other cell cultures can be grown and on which they can then be transported and delivered into the in vivo milieu of choice. In various embodiments, the scaffold 102 can include polysaccharides, modified polysaccharides, and biocompatible synthetic polymers. The scaffold 102 can include collagen foam scaffold.

Figure 2A:
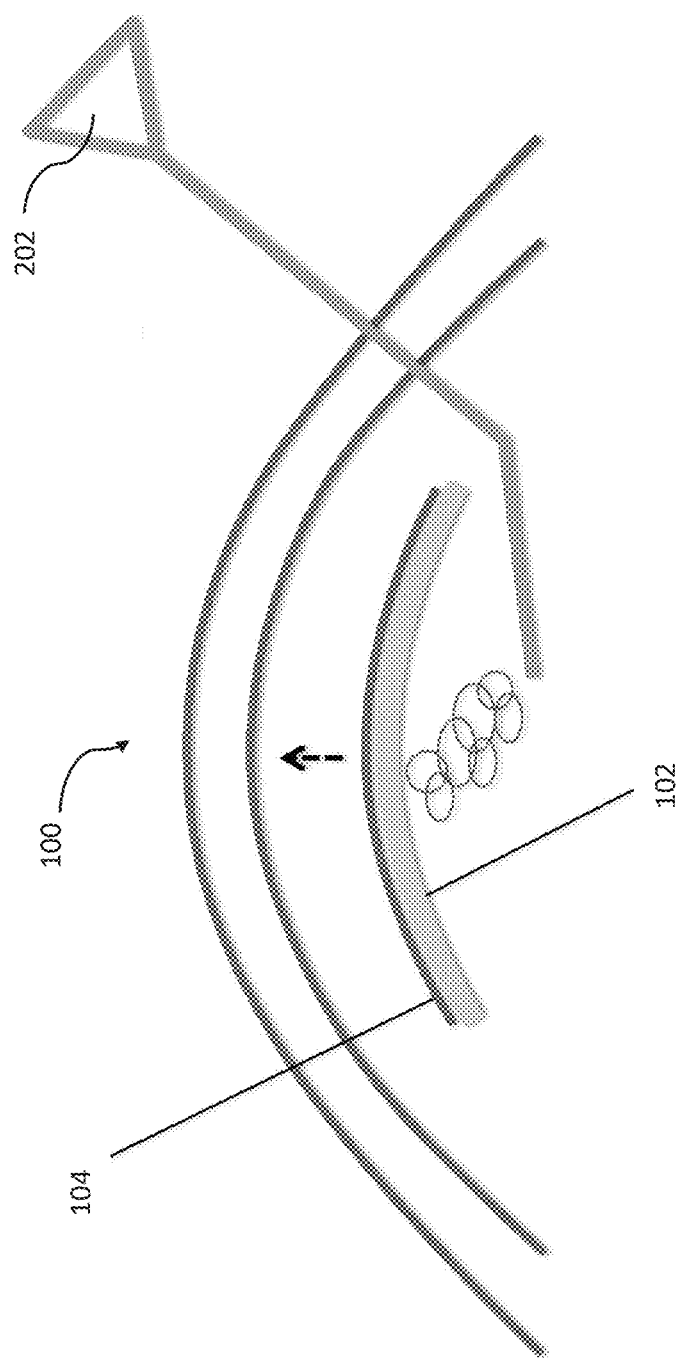
FIGS. 2A-2C illustrate an example method for implanting the example devices illustrated in FIGS. 1A and 1B according to various potential embodiments.
Figure 2B:
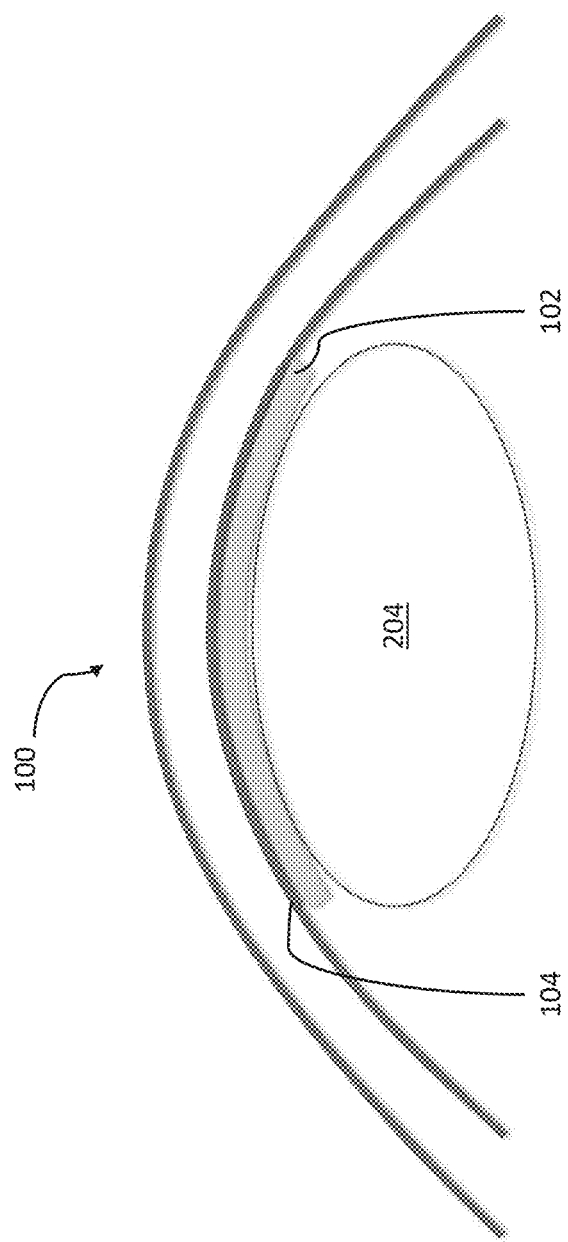
Figure 2C:
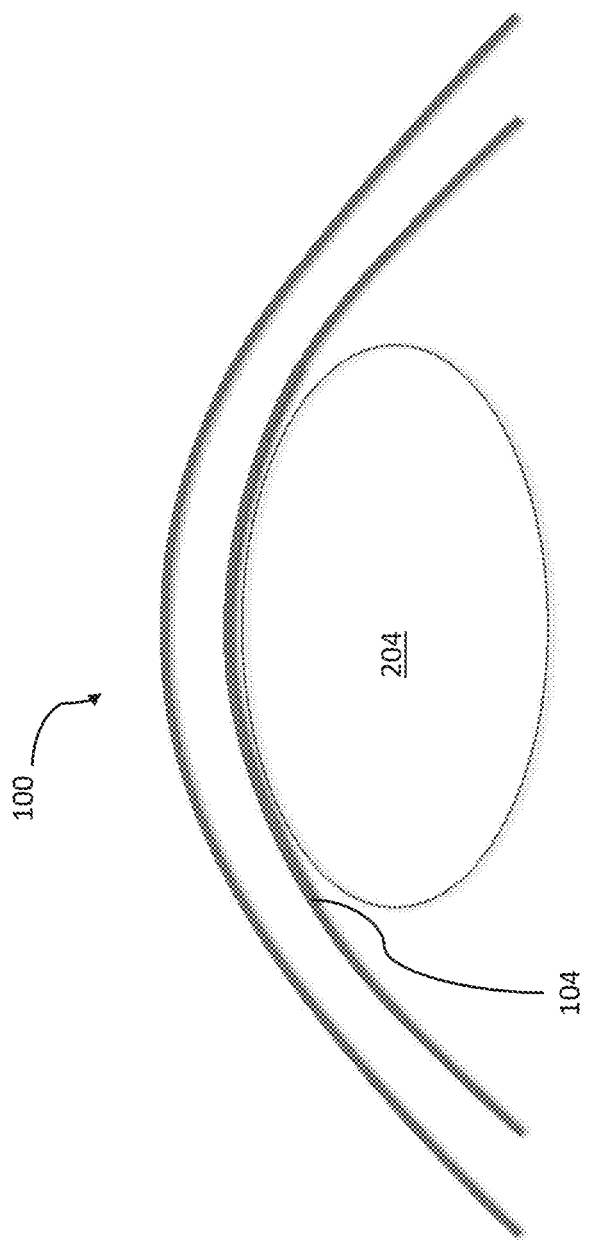

FIGS. 2A-2C illustrates example methods to implant the device 100 according to various potential embodiments. The process may include inserting the scaffold 102 and DMEK tissue 104 into the eye (FIG. 2A). In various embodiments, the device 100 may be rolled and then inserted through a small incision in the eye. In various embodiments, the device 100 may be unrolled once the device 100 is within the eye. In various embodiments, a bubble injector 202 may be used to insert a gas into the eye. The gas may form a bubble 204 below the device 100. The bubble can form a bubble tamponade that holds the device 100 in place. In various embodiments, the method may include implanting the DMEK tissue 104 (FIG. 2B). The device 100 may be implanted using one or more DSAEK implantation tools or techniques (e.g., forceps, an "Endoglide" system, or an "Endoserter system"). In various embodiments, the method may include removing the scaffold 102 (FIG. 2C). In various embodiments, the scaffold 102 may be mechanically removed by the surgeon with forceps, dissolved, or both. The scaffold 102 may be dissolved with hydrolysis, enzymatic action, and/or temperature-dependent action.

The nature of DMEK tissue can be due to the absence of a partial thickness stromal layer, which serves as a structural scaffold for the endothelium. Without the scaffold 102, the DMEK tissue 104 can require a highly specialized, unique "No Touch" surgery to be implanted. DSAEK implantation, by comparison, is a much more adaptable procedure because of the nature of the tissue. The present solution imparts properties of the DSAEK tissue onto the DMEK tissue to enable the DMEK tissue to be directly manipulated with forceps. The scaffold 102 enables the DMEK tissue 104 to rolled or taco-folded such that the DMEK tissue 104 endothelial cells are inward facing and its stroma is outward facing, all without ever directly touching the endothelium. With the scaffold 102 acting as a stromal cushion and protecting the endothelium from forceps, rolled or taco-folded DSAEK tissue can be delivered into the eye through a small incision by physical manipulation. Once inside the eye, DSAEK tissue tends to spontaneously recoil from a roll or taco into a flat disc, which obviates any need to "unscroll" the tissue.

Example devices for implanting various embodiments include forceps, an "Endoglide" system, or an "Endoserter" system. The device 100 may also be implanted with other DSAEK tissue implantation systems.

Figure 3:
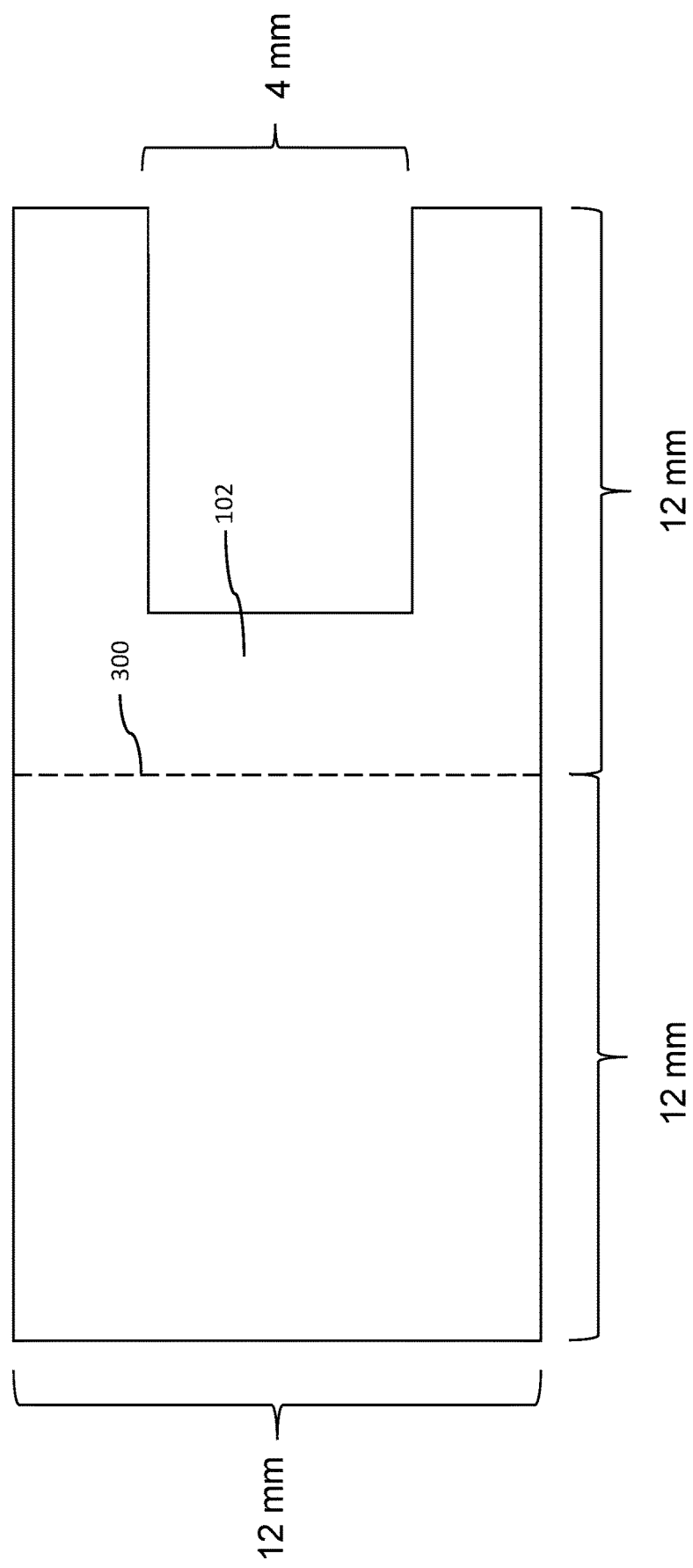
FIG. 3 illustrates a taco-fold or envelope version of the scaffold in an unfolded state according to various potential embodiments.
Figure 4:
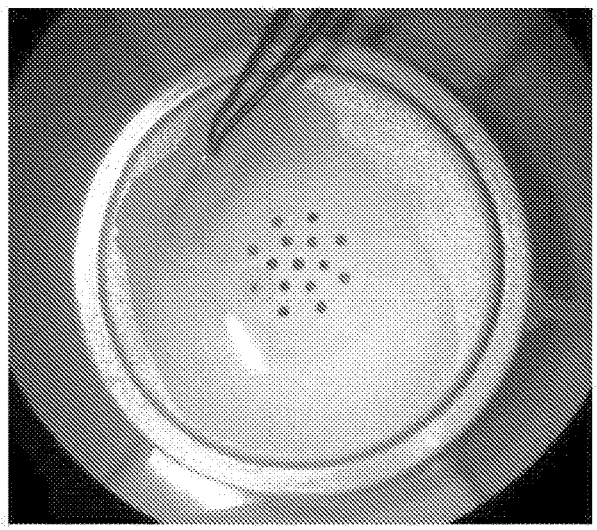
FIG. 4 illustrates an example implantation of the device according to various potential embodiments.
Figure 4:
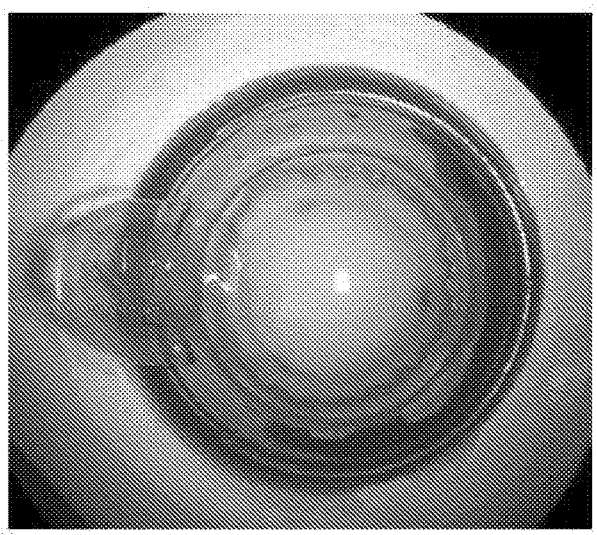
Figure 4:
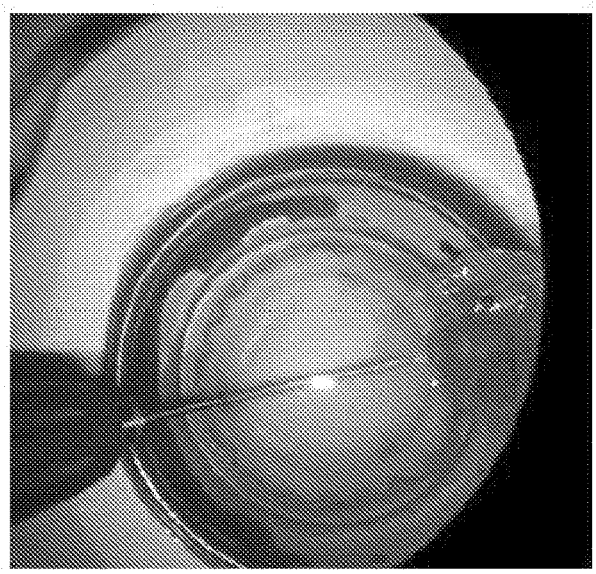
Figure 5:
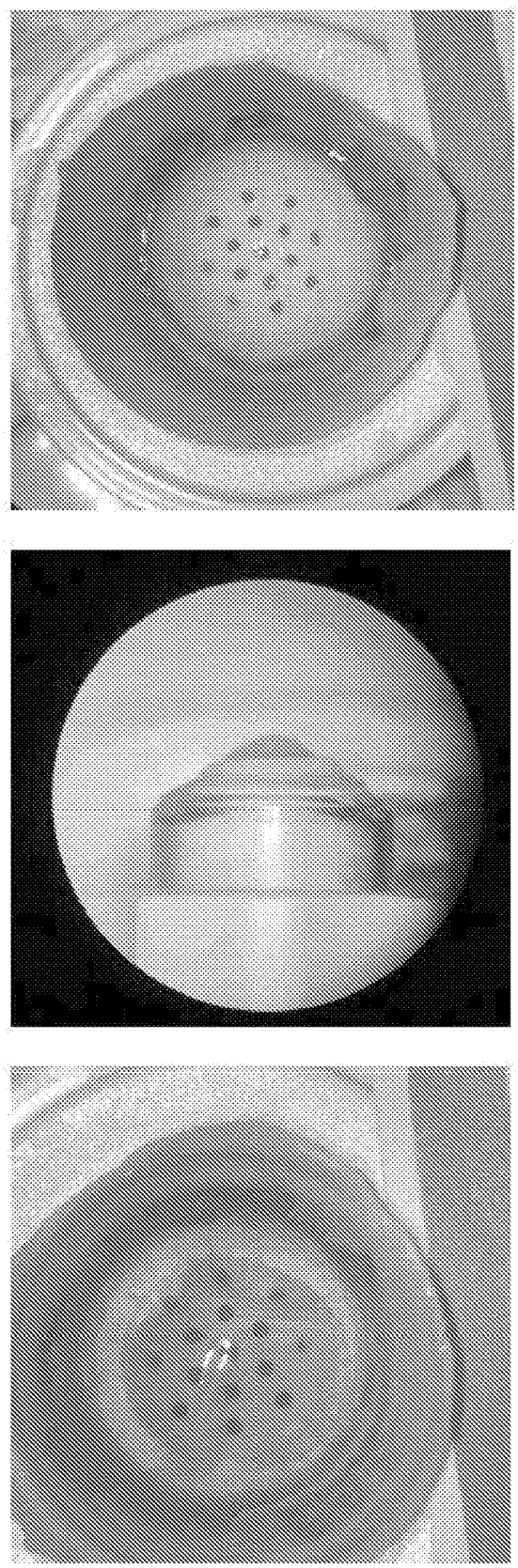
FIG. 5 illustrates an assay of the implanted device according to various potential embodiments.

FIG. 3 illustrates a taco-fold or envelope version of the scaffold 102 in an unfolded state. As illustrated in FIG. 3, the scaffold 102 can be folded at the fold line 300 to sandwich the DMEK 104 between the two halves of the scaffold 102. FIG. 4 illustrates an example implantation of the device 100. FIG. 5 illustrates an assay of the implanted device. The device was dyed with vital dyes Trypan blue and Calcein AM.

Sequential experiments were conducted with human donor corneas to evaluate whether candidate biomaterials had handling properties similar to corneal stroma, whether they adhered sufficiently to DMEK tissue to prevent it from scrolling in an aqueous environment, and whether these two properties could be combined into a single biomaterial. In various embodiments, unique variants of a disclosed hydrogel biomaterial fulfill the handling and adhesion criteria separately. In various embodiments, the addition of a hyaluronic acid layer helped form a biomaterial that had both the handling and adhesive traits desired. In various embodiments, a synthetic stromal scaffold capable of adhering to the endothelial-side of DMEK tissue is provided, carrying it in a flat configuration into a simulated human anterior chamber, and preventing it from scrolling in an aqueous milieu. A significant advantage of various embodiments of this disclosure (among other significant advantages) include making DMEK surgery resemble the DSAEK procedure, thereby making it easier for DSAEK surgeons to adopt DMEK without further skills acquisition.

Although managed differently—and to greater and lesser extents—all current approaches to DMEK surgery are limited by two intrinsic, ornery, characteristics of DMEK tissue: 1) DMEK tissue tends to "scroll-up" in an aqueous milieu rather than "spring-open," as is frequently true in conventional DSAEK; 2) DMEK tissue tends to be easily damaged with the grasping or dragging maneuvers commonly used in DSAEK, both extraocularly and intraocularly, but especially after placement of a bubble tamponade. As such, DMEK surgery, at least in its current forms, is rarely as rote or as predictable as DSAEK surgery, especially in the early stages of a surgeon's learning curve.

A Pizza Peel Hybrid DMEK technique introduces the concept of inserting DMEK tissue into the anterior chamber in a flat configuration on a temporary DSAEK stromal scaffold that is subsequently removed from the interface after placement of the gas tamponade. The technique provides postoperative visual acuity comparable to DMEK, but with higher than average endothelial cell loss compared to the surgeon's standard DMEK cases. From a research perspective, the most important implication of this technique is that it obviates the surgical challenges of unscrolling DMEK tissue. However, this Pizza Peel Hybrid DMEK technique 1) requires DSAEK stromal tissue (i.e. the donor cornea must be pre-cut and pre-stripped), and 2) requires removal of the DSAEK tissue from the interface between the DMEK tissue and the recipient stromal bed.

Recognizing the limitations of current approaches to DMEK surgery, various embodiments of the disclosure provide a synthetic stromal scaffold (SSS) comprised of a novel hydrogel biomaterial that transforms the scrolling tendencies of DMEK tissue to make DMEK tissue behave more like DSAEK tissue intraoperatively (as illustrated herein in an ex-vivo human surgical laboratory model).

Mock surgical procedures: A pre-stripped DMEK cornea was placed on a Moria punch block (Moria, Antony, France) and rinsed gently with balanced salt solution (BSS; Alcon, Fort Worth, TX). The DMEK graft was stained with 0.06% Trypan blue (Stephens Instruments, Lexington, KY) for 3 minutes by injecting the dye with a cannula between Descemet's membrane and the stroma. The stained tissue was subsequently rinsed with BSS. The anhydrous disc of synthetic scaffold was hydrated with BSS for 1 minute and placed onto the endothelium of the donor cornea using Colibri-style forceps. The synthetic scaffold, DMEK, and underlying corneal stroma were punched with a 7.5 mm Moria donor punch.

Another donor cornea was mounted onto an artificial anterior chamber (AAC; Coronet Network Medical, North Yorkshire, United Kingdom) over BSS and pressurized to simulate the human eye. A 1 mm paracentesis incision was made, and a 5 mm clear corneal incision was made in the opposite clock-hour; the AAC was then positioned with respect to the surgeon such that the incisions were ergonomically oriented for a pull-through technique (i.e. such that the surgeon was sitting 'superiorly' with respect to the temporal main incision and nasal paracentesis incision).

The DMEK-scaffold complex was grasped together with forceps and transferred onto the peripheral surface of the AAC such that the synthetic scaffold was on the bottom and the DMEK graft was on top of it, facing endothelial-side-down. The complex was pulled into the AAC with microforceps.

The behavior of the DMEK-scaffold complex when its components were grasped with Colibri-style forceps and micro-forceps was observed. The behavior of the complex when it was pulled through the corneal tunnel was also observed, as was its behavior once the complex was inside of the BSS-filled AAC. A supporting air tamponade was introduced to lift the DMEK-scaffold complex into apposition with the 'recipient' stromal bed. Successful 'transplants' were examined by anterior segment optical coherence tomography (OCT; Optovue, Fremont, CA, USA).

Test materials: Given the known biocompatibility and widespread use of carboxymethylcellulose (CMC), polyethylene glycol (PEG), and hyaluronic acid (HA) in medical applications, including ophthalmology, laboratory experiments with biomaterial based on these three components were performed as described below.

Experiment 1: An anhydrous material (SSS-1) was synthesized with a Young's modulus of elasticity (ME) approximating that of human corneal stromal tissue. SSS-1 was shaped into an anhydrous disc.

Experiment 2: Based on the results of experiment 1, an anhydrous material (SSS-2) comprised predominantly of hyaluronic acid was synthesized to augment adhesion between the synthetic scaffold and the DMEK tissue.

Experiment 3: Based on the results of experiments 1 and 2, the anhydrous material SSS-1 was used in combination with a commercially available sodium hyaluronic acid (Viscoat [sodium chondroitin sulfate 4%-sodium hyaluronate 3%], Alcon, Fort Worth, TX, USA; and Healon GV [sodium hyaluronate 1.4%], Johnson & Johnson, Santa Ana, CA, USA) to combine the adhesive properties of SSS-2 with the handling properties of SSS-1. Sodium hyaluronic acid was placed on the endothelium of the pre-stripped DMEK graft, SSS-1 was placed directly on top of the hyaluronic acid layer, and the composite was punched to a diameter of 7.5 mm.

Figure 7A:
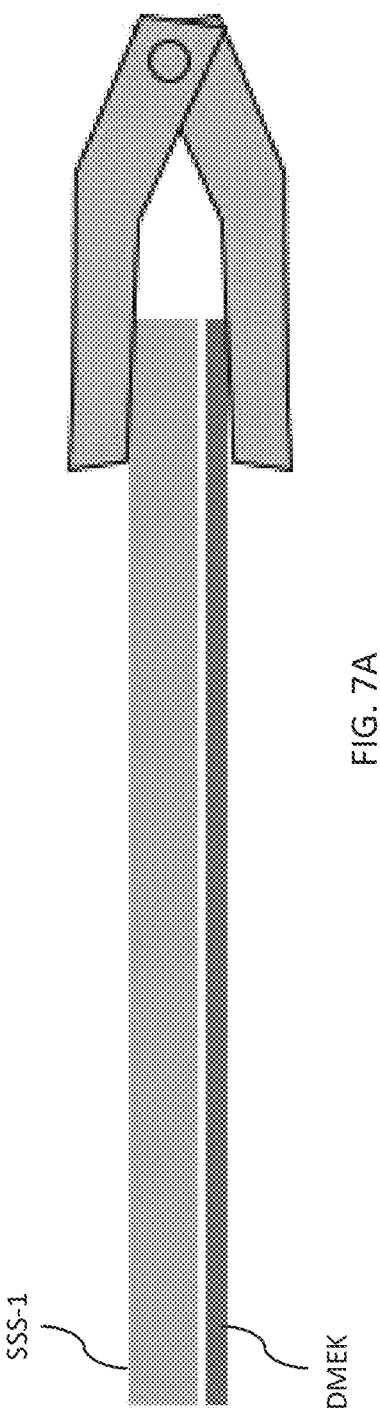
FIGS. 7A-7D: Experiment 1—Outcome of Mock Pull-Through DMEK Surgery with Synthetic Stromal Scaffold #1 (SSS-1).

Results of Experiment 1: After 1 minute of hydration, the SSS-1 was readily grasped and manipulated with Colibri-style forceps without cheese-wiring or fragmenting. Adherence of SSS-1 to the DMEK tissue was insufficient for the graft to be indirectly moved by grasping only the synthetic disc. After the punch was rendered, both the DMEK and SSS-1 had to be grasped between the jaws of the forceps to move them as a complex (FIG. 7A).

Figure 7C:
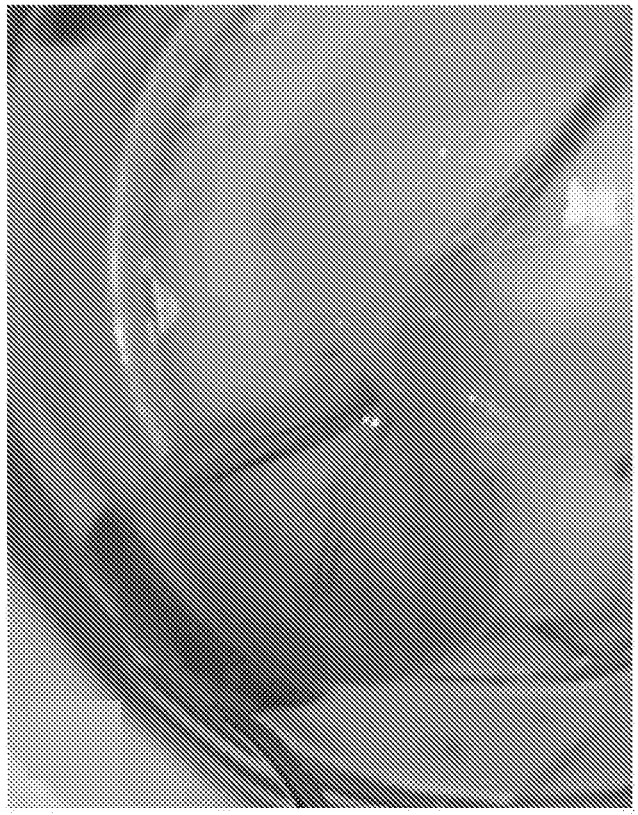
Figure 7B:
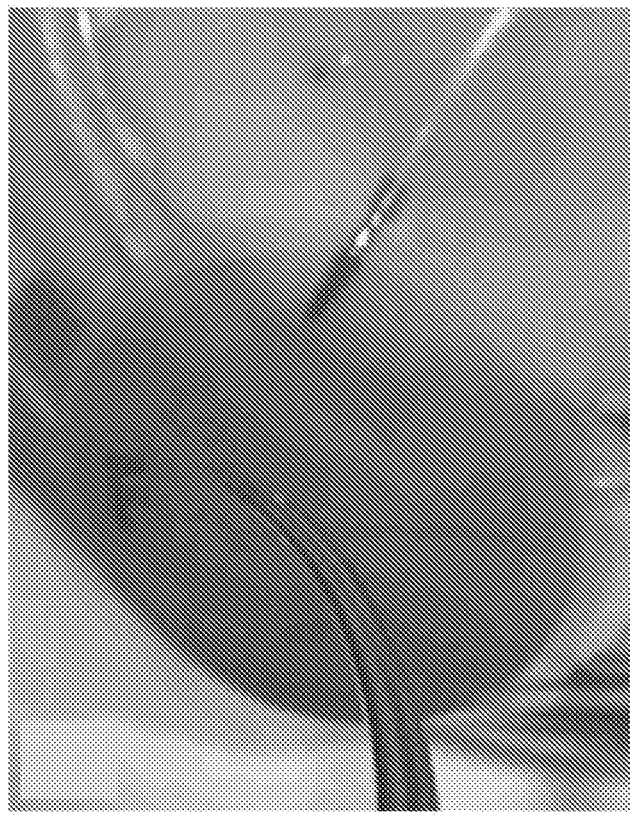
Figure 7D:
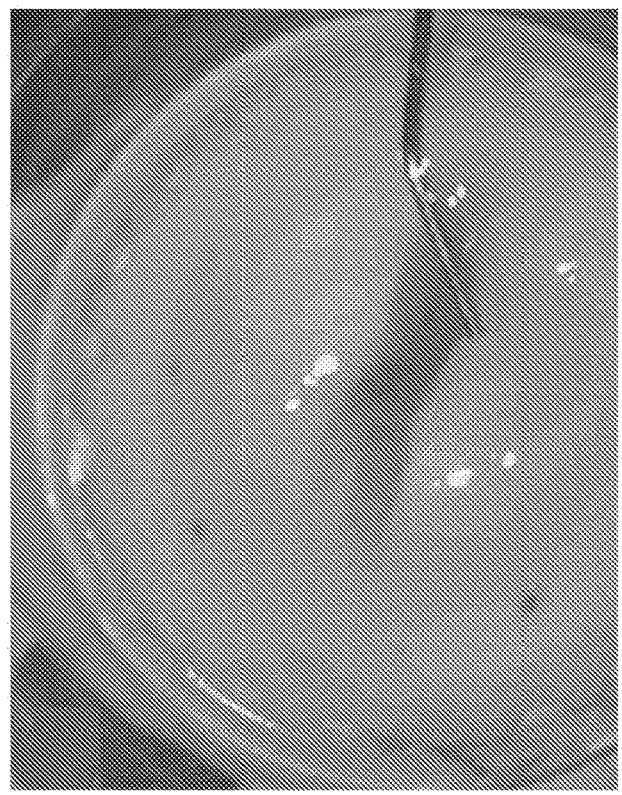

A simulated pull-through maneuver of the DMEK-SSS-1 complex was successfully executed with micro-forceps. As the complex was dragged through the 5 mm corneal incision, the SSS-1 synthetic scaffold readily deformed together with the DMEK by wrinkling and curling in a manner very similar to DSAEK pulled through a 5 mm incision (FIGS. 7B, 7C). Once inside of the AAC, the SSS-1 disc spontaneously sprung open into a planar configuration, but the DMEK tissue detached from the material and curled into a "double scroll" (FIG. 7D).

Results of Experiment 2: After 1 minute of hydration, the SSS-2 was neither readily grasped nor manipulated with Colibri-style forceps. The forceps easily 'cheese-wired' through the material. Given the jelly-like nature of the SSS-2 material, it was not possible to pull the DMEK-SSS-2 complex into the "recipient" eye.

Figure 8A:
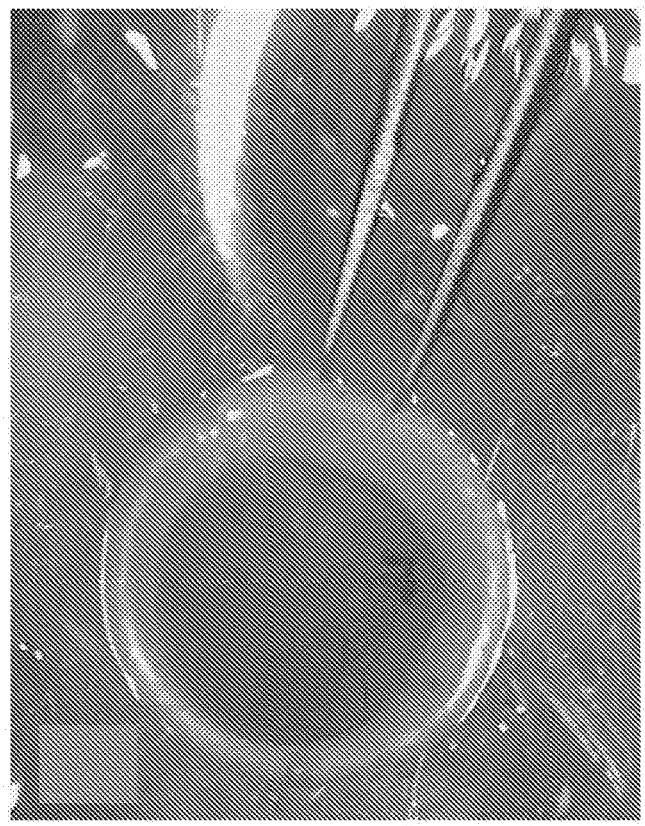
FIG. 8A-8D: Experiment 2 (FIG. 8A)—Outcome of Adhesion Testing with Synthetic Stromal Scaffold #2 (SSS-2); and Experiment 3 (FIGS. 8B-8D)—Mock Pull-Through DMEK Surgery with SSS-1 After Adding a Hyaluronic Acid layer for Improved Adhesion.

The DMEK-SSS-2 complex was instead transferred into a petri dish filled with BSS using a corneal spatula. When submersed in the petri dish, the DMEK remained adherent to the material, which remained planar in its configuration. The DMEK tissue did not scroll (FIG. 8A).

Figure 8C:
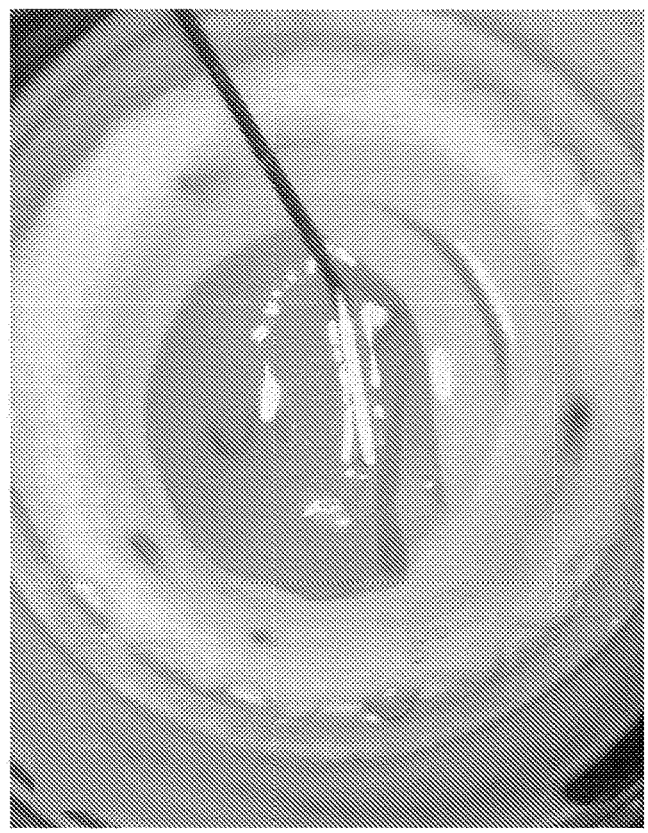
Figure 8B:
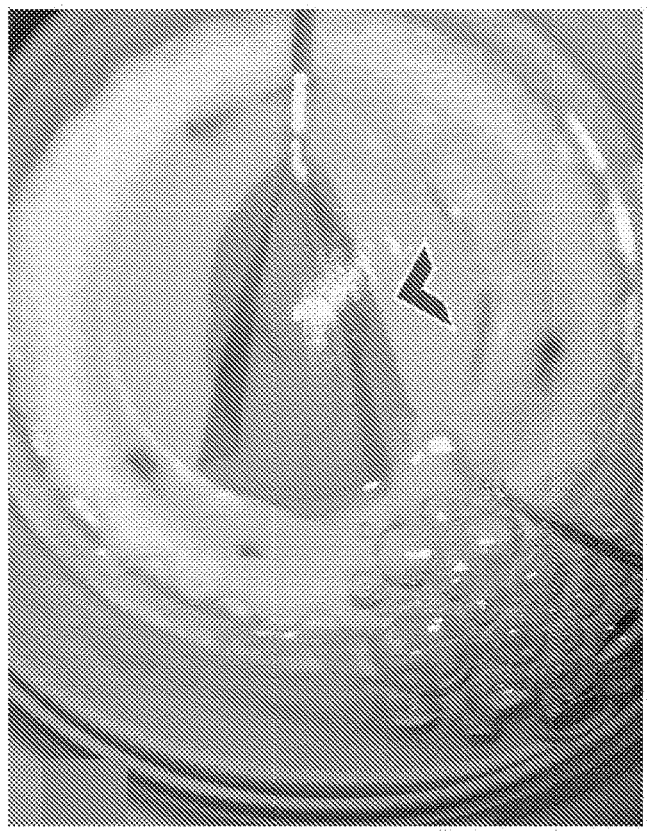
Figure 8D:
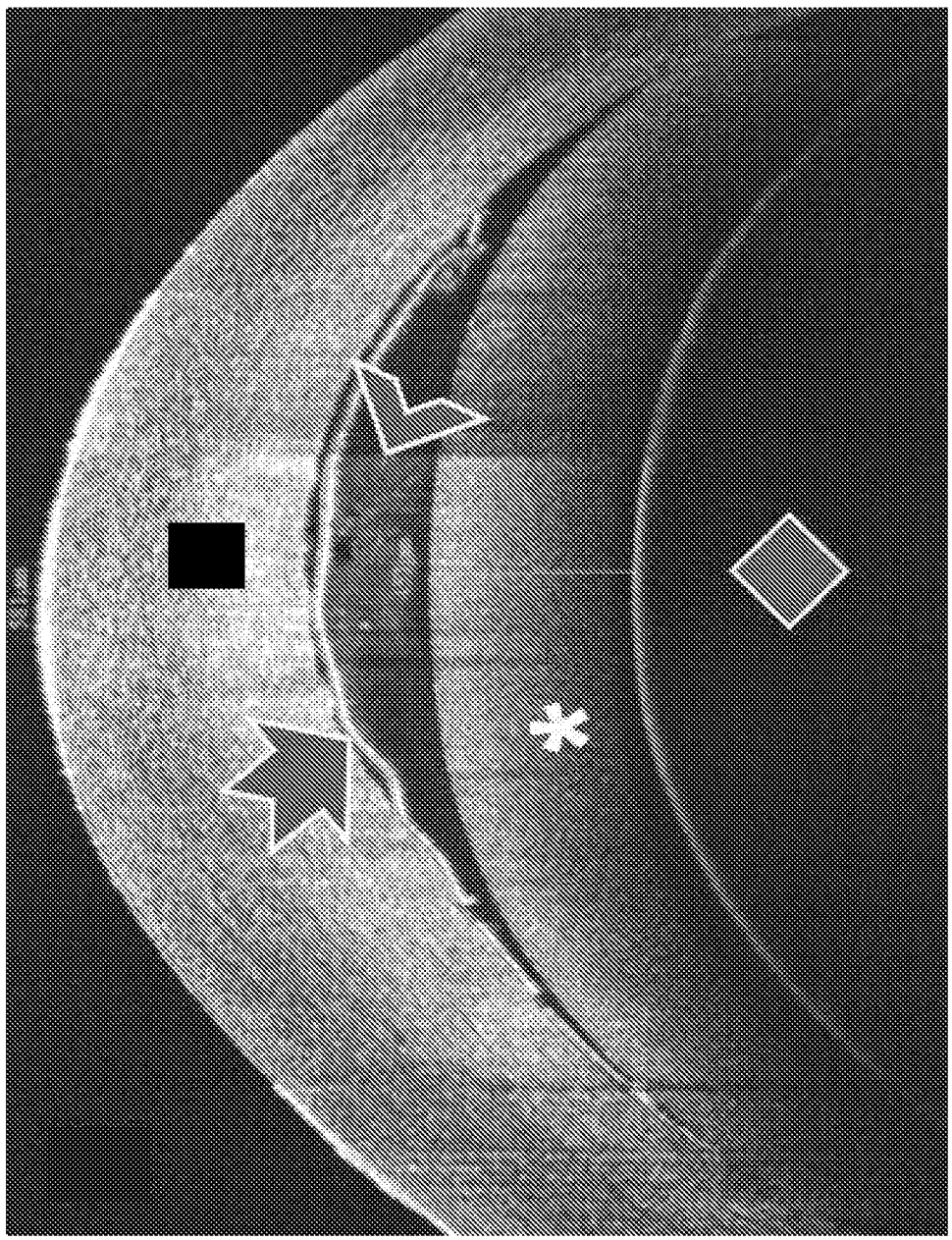
Figure 9B:
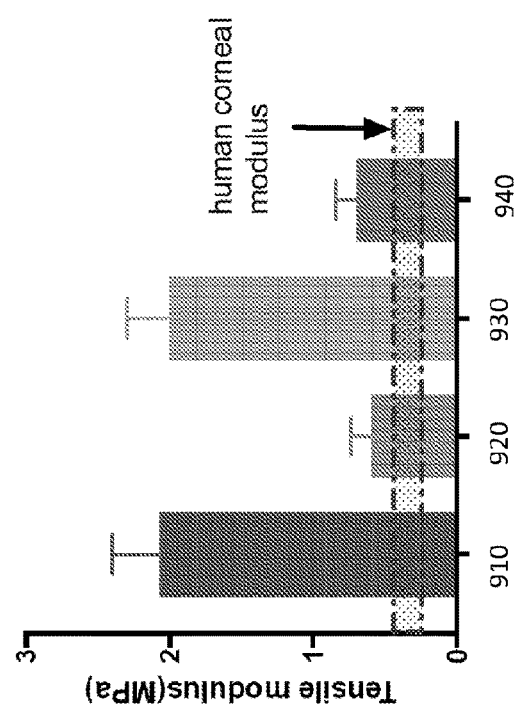
FIG. 9B: Tensile strengths of the hydrogel are comparable to the native stromal tissue (920 and 940), thus allowing them to be grasped with forceps without damage.
Figure 9A:
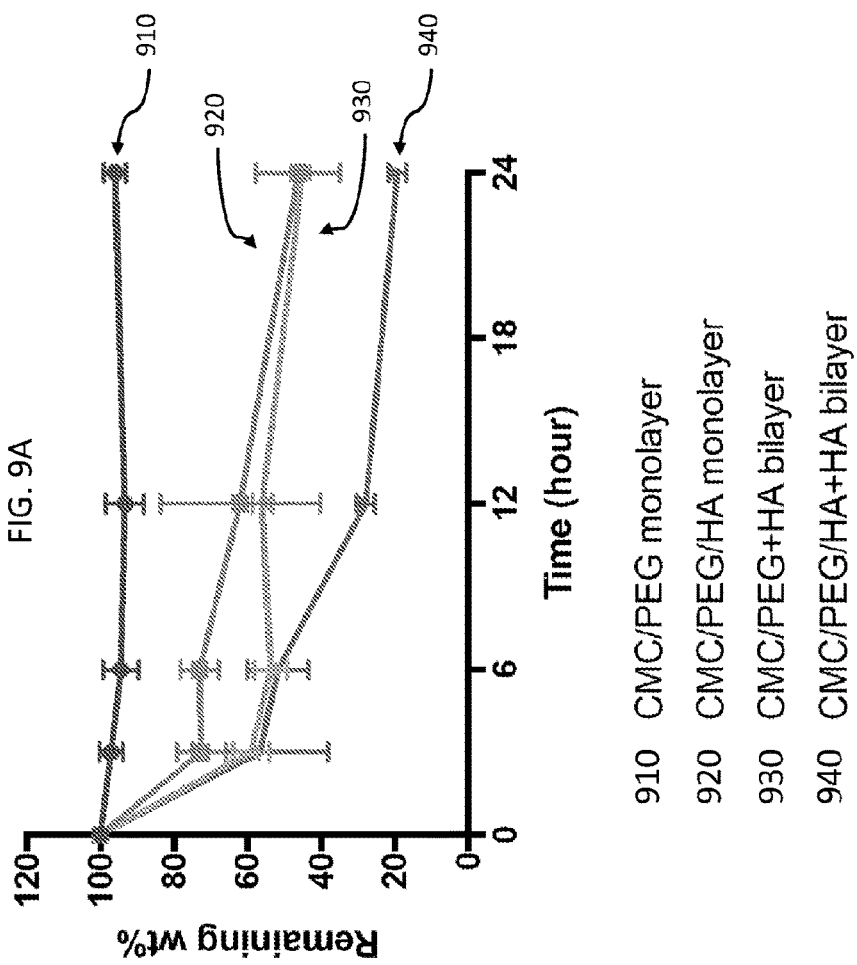
FIG. 9A: Integration of hyaluronic acid (HA) into the hydrogel increases its degradation rate, with less than 20% left within 24 hours in a physiologic simulated environment (940).
Figure 9D:
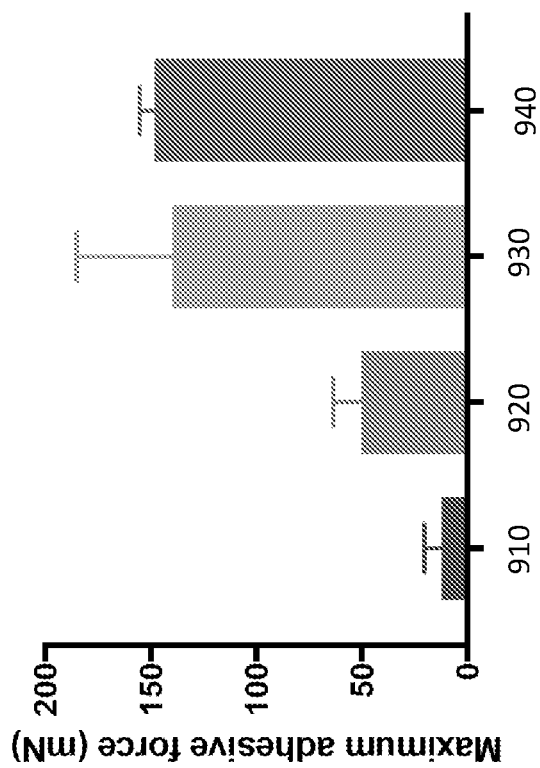
FIG. 9D: The adhesion force of the hydrogel increases with addition of HA, thus facilitating its adhesion to the tissue.
Figure 9C:
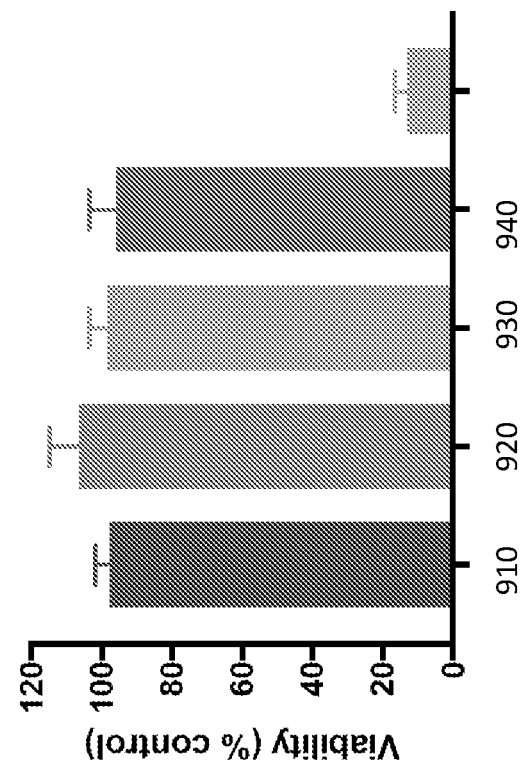
FIG. 9C: All of the hydrogels demonstrate excellent biocompatibility using a MTT cell viability assay.
Figure 9E:
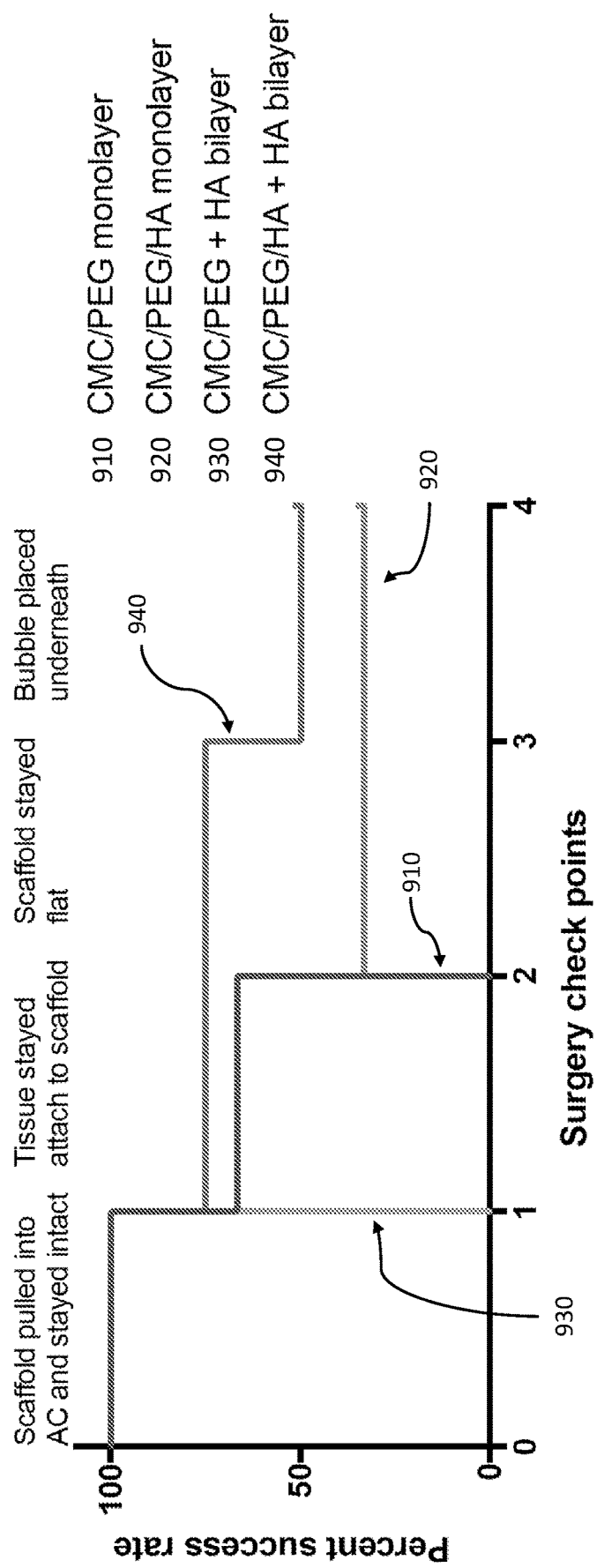
FIG. 9E: Performance of the hydrogel in a simulated surgery.

Results of Experiment 3: A simulated pull-through maneuver was successfully executed with the DMEK-hyaluronic acid-SSS-1 complex using both Viscoat and Healon GV. The material and tissue behaved similar to what was observed in Experiment 1, except once inside of the AAC, the DMEK tissue remained mostly adherent to the SSS-1 disc. Where the viscoelastic was squeezed out of the interface by the peripheral margins of the incision, graft adherence to the scaffold was not as strong but still sufficient to prevent it from curling into a scroll. The complex was successfully lifted against the "recipient" using an air bubble tamponade (FIG. 8B). Wrinkles and folds in the DMEK graft were resolved using sweeping maneuvers typical of DSAEK (FIG. 8C). OCT images confirmed that the scaffold-hyaluronic acid-composite had 'implanted' the DMEK graft into proper position against the recipient stroma (FIG. 9D).

As illustrated in the experiments above, the use of a series of biomaterials was explored to make DMEK more accessible to surgeons untrained in DMEK but already skilled in DSAEK by making DMEK tissue behave more like DSAEK tissue intraoperatively in a surgical laboratory model. The goal was to replace human DSAEK stromal tissue used as a removable scaffold on the interface-side of the DMEK in our Pizza Peel Hybrid technique with a synthetic scaffold used on the endothelial-side of the DMEK, which could be either removed from or dissolved in the anterior chamber.

Figure 6:
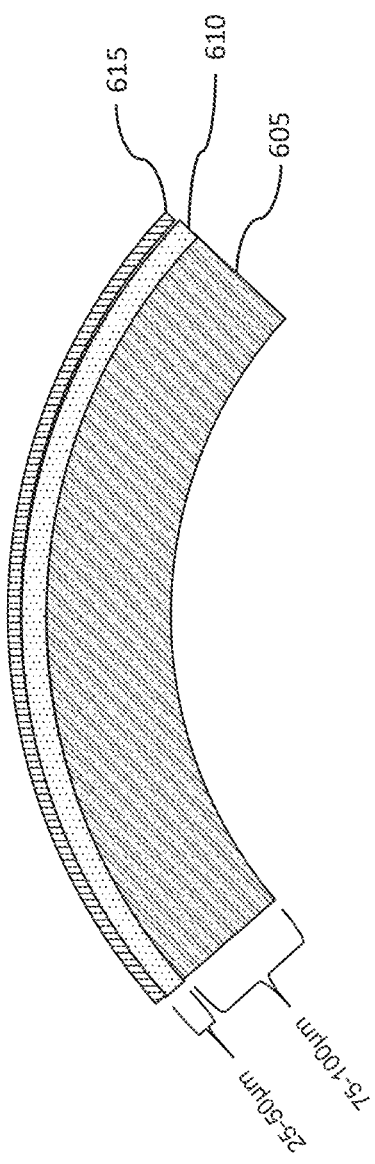
FIG. 6: Synthetic biomaterial containing dual layers that combine ideal handling and adhesion properties according to various potential embodiments. In example embodiments, the ideal material may combine a synthetic layer 605 (e.g., a Synthetic Stromal Scaffold (SSS) layer, such as an SSS layer with the strength and pliability of SSS #1 (SSS-1), discussed below), and the temporary adhesive properties of hyaluronic acid (610) but be no thicker than, for example, about 100-150 microns, to deliver a DMEK graft (615).

The results illustrate that the various embodiments of the disclosure provide a biomaterial that 1) mimics the corneal stroma's behavior with direct forceps-manipulation and 2) adheres sufficiently to DMEK tissue to prevent it from scrolling in the aqueous milieu of the eye. These properties were achieved separately in two hydrogels (of various embodiments) whose desirable properties were subsequently combined into a synthetic scaffold-hyaluronic acid-composite (of various embodiments) with the addition of a commercially available ophthalmic viscoelastic device. Various embodiments may also include a synthetic scaffold bilayer comprised of a 75-100 micron hydrogel layer and a 25-50 micron hyaluronic acid layer (FIG. 6). The peripheral creasing observed in Experiment 3 may be addressed with a thinner SSS-1-hyaluronic acid-bilayer, which in this material may be nearly 500 microns in total and is responsible for significant friction during passage of the complex through the peripheral margins of the 5 mm incision.

The data presented herein illustrates various embodiments that provide a biomaterial that meets the design criteria for a SSS capable of transforming the handling properties of DMEK tissue to approximate those of DSAEK tissue. In various embodiments, the disclosed biomaterial fulfills four significant requirements: 1) Biocompatibility with the endothelium to rival the published endothelial cell loss outcomes of high-volume DMEK and DSAEK surgeons; 2) Young's modulus of elasticity that mimics corneal stroma and enables the scaffold to pass through an incision smaller than its own diameter—whether in a disc, taco, or rolled configuration—and then spontaneously recoil open into a flat disc; 3) Tensile strength sufficient to enable pull-through and push-in DSAEK maneuvers with the use of existing surgical instrumentation; and 4) Adhesion to DMEK tissue such that the DMEK-SSS complex effectively behaves as a single unit, thereby transferring the recoil properties of the SSS to the DMEK graft to prevent the tissue from spontaneously scrolling in an aqueous environment.

Of additional significant for delivering DMEK tissue into the human eye, it is expected that a biomaterial of various embodiments will meet one or more of the requisite solubility, reversibility of the adhesion, and biocompatibility with the intraocular milieu.

Various embodiments of the disclosure address the slow adoption of DMEK in the United States by transforming DSAEK surgeons into DMEK surgeons without requiring them to adopt a new set of skills. By transforming the behavior of DMEK tissue, which is generally rather ornery and unpredictable until one is experienced in DMEK, embodiments of the disclosed biomaterial provide DMEK tissue with the ability to mimic the behavior of DSAEK tissue, which is comparatively much easier to manage at all levels of experience.

Changing the tissue (per various embodiments of the disclosure) rather than the surgeon has four significant advantages: 1) Mostly eliminate the need to develop new surgical instrumentation; 2) Drastically shorten, if not nearly eliminate, the DMEK learning curve because DSAEK surgeons would perform DMEK with their established DSAEK insertion technique; 3) Expand the potential candidates for DMEK to include patients currently excluded using a chamber-shallowing tapping technique, including eyes with absent or abnormal iris diaphragms and unicameral eyes; and/or 4) Expand the potential donors for DMEK to include tissues currently excluded from the donor pool because of their high propensity to scroll (i.e. tissues younger than 50 years of age).

The ex-vivo laboratory results presented herein illustrate that a biomaterial scaffold of various embodiments mimics the handling properties of corneal stroma and adheres sufficiently to the endothelial-side of DMEK tissue to prevent it from scrolling in an aqueous milieu. These properties, together with endothelial biocompatibility, deskill the DMEK procedure by transiently making DMEK tissue behave more like DSAEK tissue, but without the compromises of requiring additional tissue processing or removal of the scaffold from the graft-stromal interface as previously described in the 'Pizza Peel Hybrid DMEK' technique. Further study of the biomaterial's synthesis parameters and chemical properties, including solubility and modulus of elasticity, in addition to further evaluation of the biomaterial in ex vivo human surgical models and in vivo animal models, is expected to further support the significant advantages provided by the present technology.

Various embodiments may comprise a PEG-crosslinked-carboxymethylcellulose (CMC)-HA hydrogel with an HA topcoat, herein referred to as the PEG-CMC-HA+HA bilayer. A PEG-crosslinked hydrogel has known biocompatibility in the field of biomaterials and the favorable handling characteristics and water-solubility exhibited by PEG-HA during early testing despite its incomplete purification.

Figure 10A:
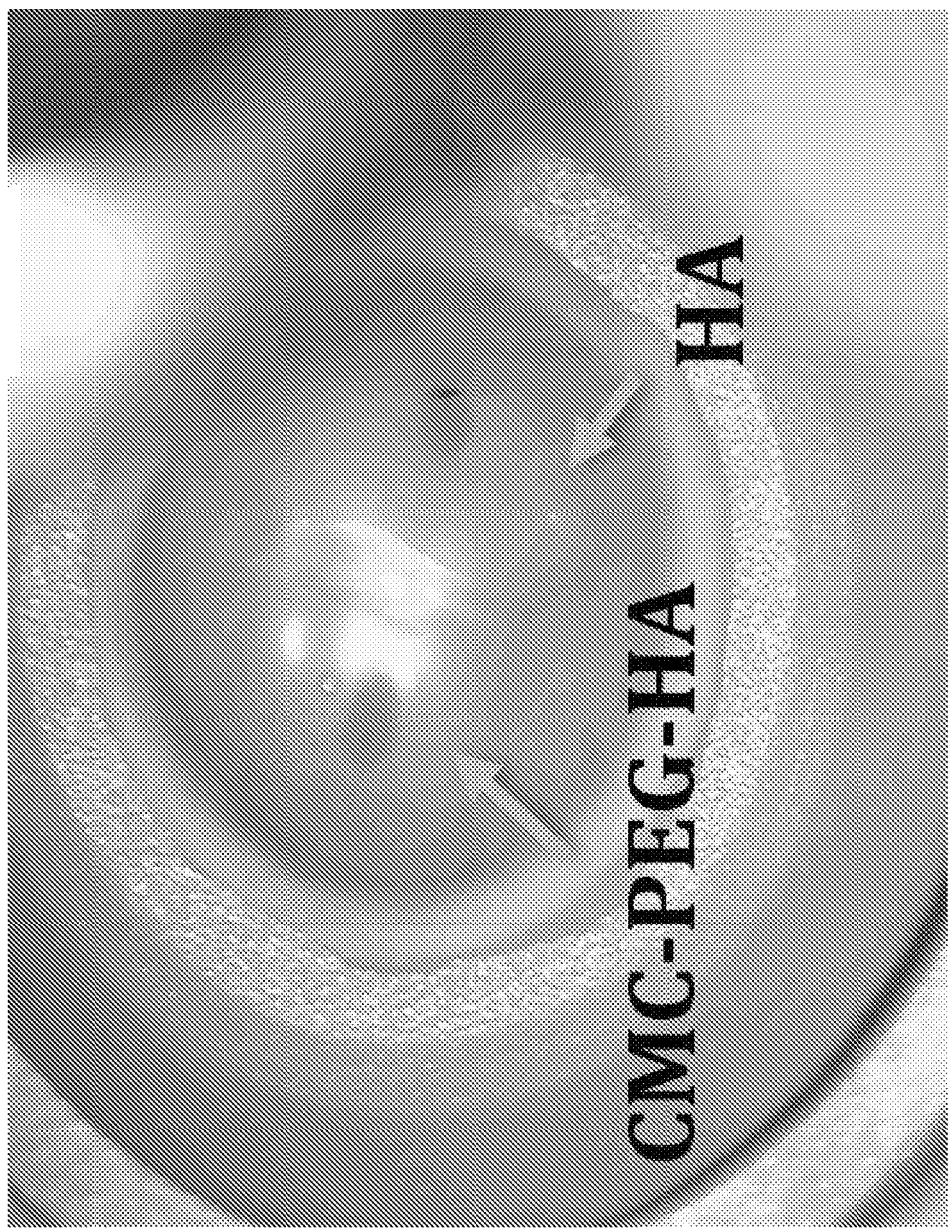
FIGS. 10A-10C: Ex vivo human endothelial cell viability testing.
Figure 10B:
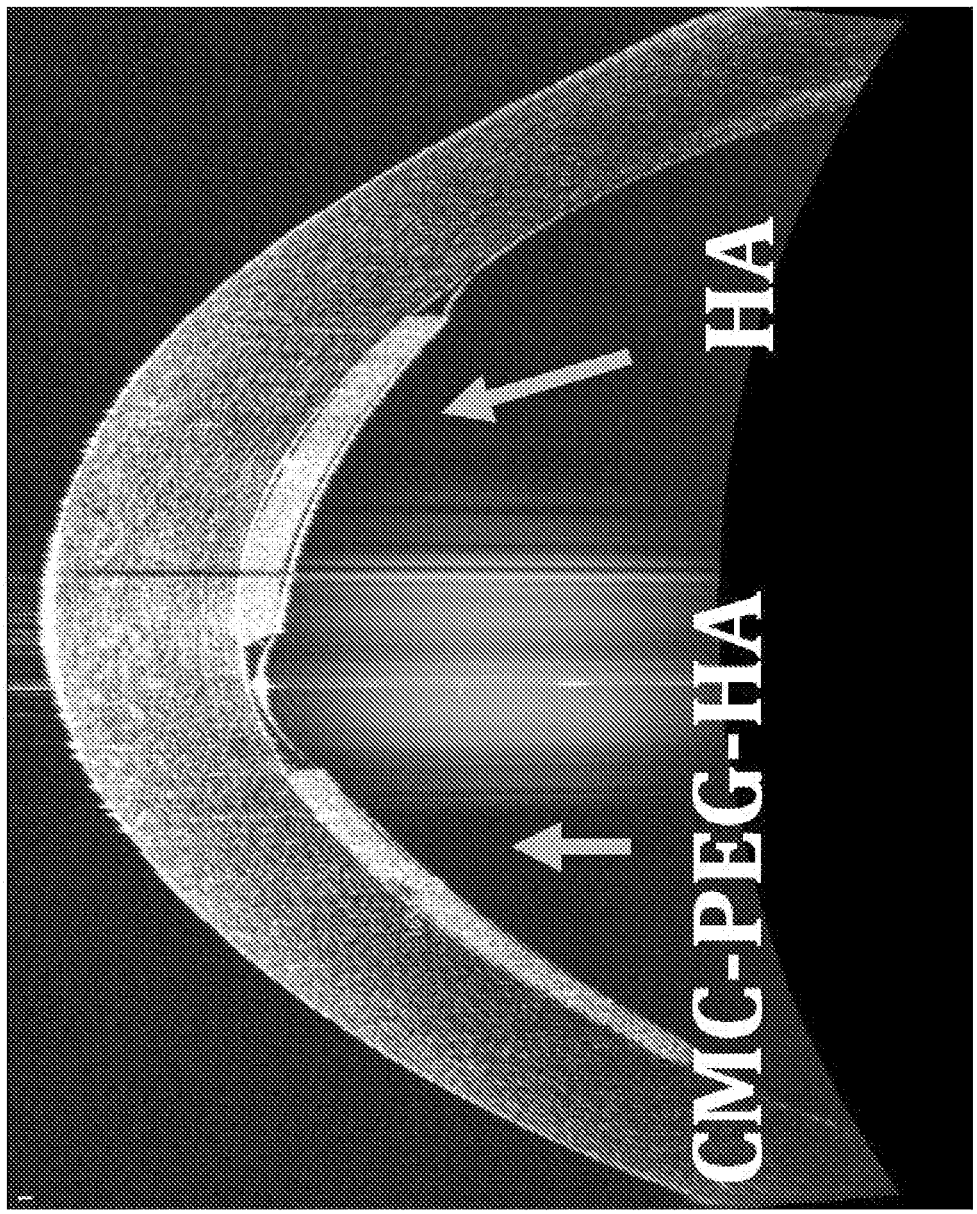
Figure 10C:
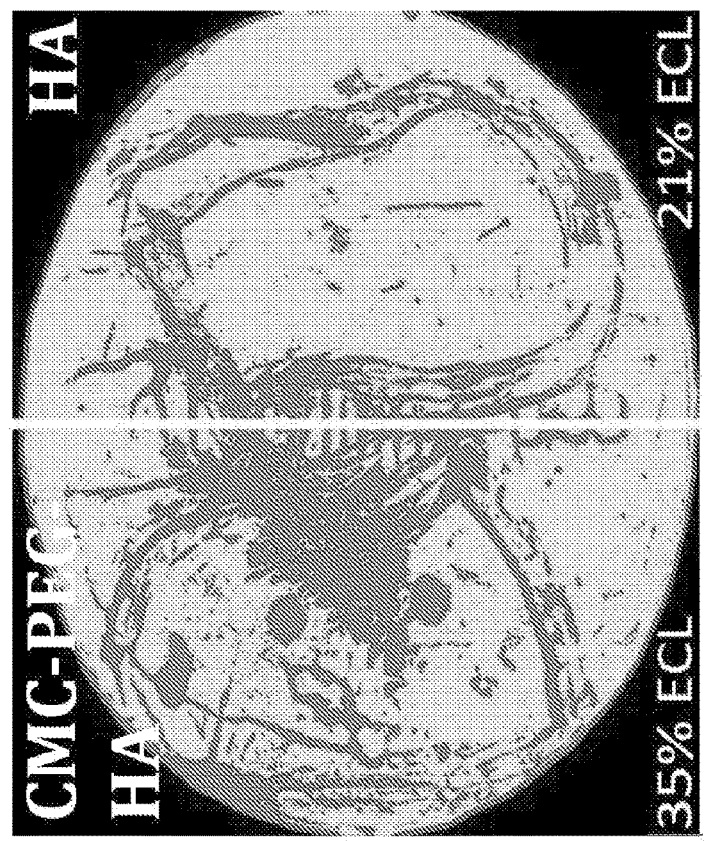

Shaping of the hydrogel into a DSAEK-like disc will now be discussed with reference to FIGS. 10 and 11. A less than 100 μm PEG-CMC-HA+HA bilayer may be manufactured, for example, by injection molding with or without micro perforations, or using pourable molds. In various embodiments, endothelial viability testing of bi-layered hydrogel discs without micro perforations exhibited good corneal endothelial biocompatibility. With reference to FIG. 10, ex vivo human endothelial cell viability testing demonstrated that a PEG-CMC-HA+HA bilayer is biocompatible with human corneal endothelial cells. An unforeseen challenge of meeting this technical milestone was developing a valid assay for evaluating the effect of disc-shaped biomaterials on the human corneal endothelium. The challenge of developing a material that was biocompatible with corneal endothelium was surmounted by adopting a bi-layered device with an HA topcoat. In various embodiments, the CMC-PEG-HA+HA bilayer hydrogel dissolves in less than 2 days at body temperature.

Figure 11A:
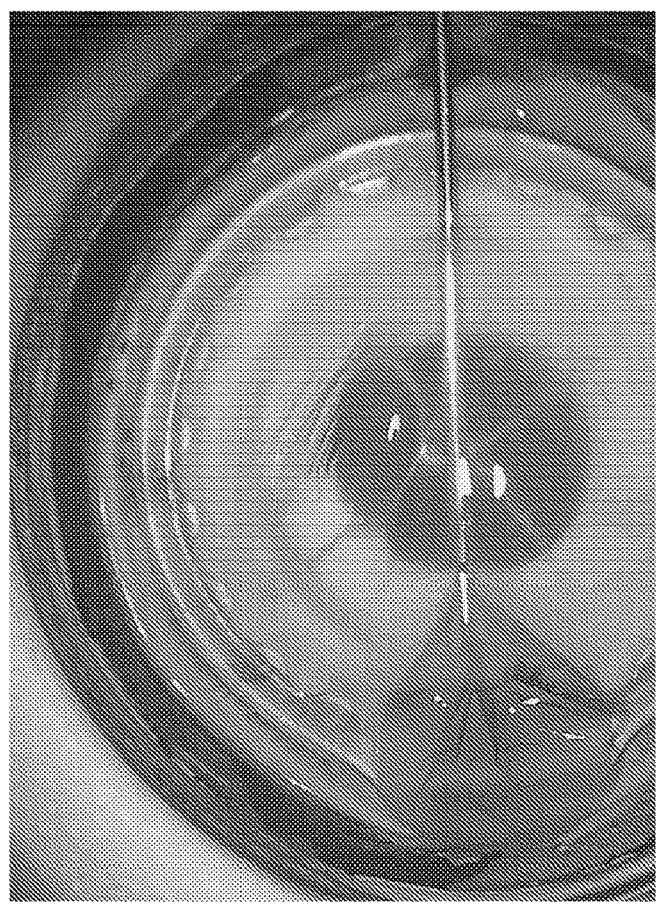
FIG. 11A: Surgical photo of a pull-through DSAEK technique being successfully executed with DMEK tissue on the PEG-CMC-HA+HA hydrogel scaffold.
Figure 11C:
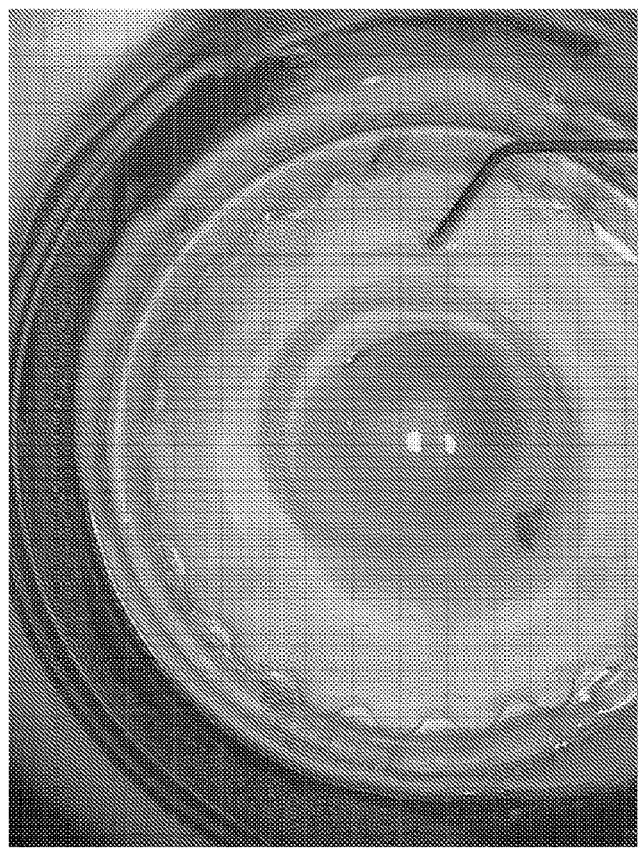
FIG. 11. Ex vivo simulated DMEK surgery with living human DMEK tissue.
FIG. 11B: Surgical photo of an "Endoserter" DSAEK technique being successfully executed with DMEK tissue on the PEG-CMC-HA+HA hydrogel scaffold. 11C: Surgical photo of a supporting bubble being placed beneath DMEK tissue on the PEG-CMC-HA+HA hydrogel scaffold.
Figure 11B:
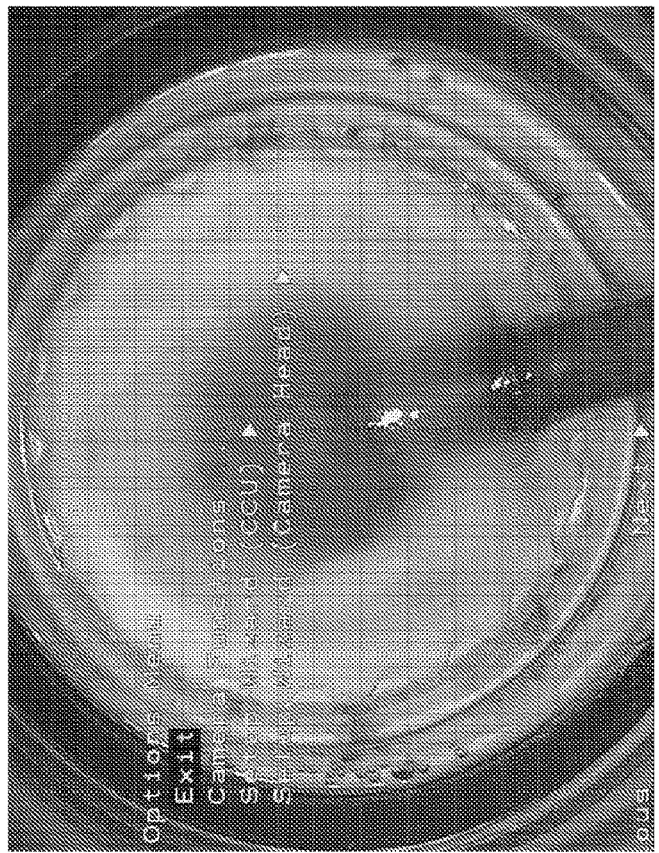

With reference to FIG. 11, ex vivo simulated DMEK surgery with living Human DMEK tissue demonstrated that a PEG-CMC-HA+HA bilayer is surgically viable in an ex vivo human model eye. An unexpected challenge of meeting this technical milestone was temporarily bonding the hydrogel scaffold to the DMEK tissue such that the tissue remained attached to the biomaterial as it passed through the corneal incision. Various embodiments may address this by the HA bilayer concept; in various embodiments, an HA topcoat of the bilayer confers the scaffold's biocompatibility with corneal endothelium and its adhesion to the allograft. In various embodiments, the synthetic scaffold, after injection of a bubble beneath it, may be removed or biodegraded.

Various example embodiments include, without limitation:

Embodiment A: An endothelial keratoplasty device comprising: a Descemet membrane endothelial tissue layer; and a synthetic scaffold adhered to the Descemet membrane endothelial tissue layer to reduce spontaneous scrolling of the Descemet membrane endothelial tissue layer in an aqueous environment.

Embodiment B: The device of Embodiment A, wherein the synthetic scaffold has a thickness that is no greater than 150 microns.

Embodiment C: The device of either Embodiment A or Embodiment B, wherein the synthetic scaffold comprises at least one of carboxymethylcellulose (CMC), polyethylene glycol (PEG), and hyaluronic acid (HA).

Embodiment D: The device of any of Embodiments A-C, wherein the synthetic scaffold comprises CMC, PEG, and HA.

Embodiment E: The device of any of Embodiments A-D, wherein the synthetic scaffold is a bilayer scaffold.

Embodiment F: The device of any of Embodiments A-E, wherein the synthetic scaffold is biochemically dissolvable via hydrolysis, enzymatic action, or temperature-dependent action.

Embodiment G: The device of any of Embodiments A-F, wherein the synthetic scaffold comprises a layer adhered to an endothelial-cell-side of the Descemet membrane endothelial tissue layer.

Embodiment H: The device of any of Embodiments A-G, wherein the synthetic scaffold comprises a layer adhered to a Descemet-membrane-side of the Descemet membrane endothelial tissue layer.

Embodiment I: The device of any of Embodiments A-H, wherein the synthetic scaffold comprises a first layer adhered to an endothelial-cell-side of the Descemet membrane endothelial tissue layer and a second layer adhered to a Descemet-membrane-side of the Descemet membrane endothelial tissue layer.

Embodiment J: The device of any of Embodiments A-I, wherein the first layer comprises carboxymethylcellulose (CMC) and polyethylene glycol (PEG), and wherein the second layer comprises hyaluronic acid (HA).

Embodiment K: The device of any of Embodiments A-J, wherein the first layer further comprises HA.

Embodiment L: The device of any of Embodiments A-K, wherein the first layer comprises CMC, PEG, and HA, and wherein the second layer comprises HA.

Embodiment M: The device of any of Embodiments A-L, where the device may comprise a first layer comprising CMC, PEG, and/or HA in varying proportions, and a second (surface) layer comprising HA (e.g., 100% HA, at least 90% HA, or at least 50% HA).

Embodiment N: The device of any of Embodiments A-M, wherein the device may comprise a first layer comprising mostly (i.e., at least 50%) or substantially (e.g., at least 90% or at least 95%) CMC, PEG, and/or HA, with other compounds incorporated as part of the remaining up to 50%, remaining up to 10%, remaining up to 5%, etc.

Embodiment O: The device of any of Embodiments A-N, wherein the surface layer, whatever its composition, is biocompatible with corneal endothelial cells.

Embodiment P: The device of any of Embodiments A-O, wherein the synthetic scaffold may be monolayer or bilayer or may have more than two layers (e.g., 3, 4, or 5 layers).

Embodiment Q: An endothelial keratoplasty device comprising: a Descemet membrane endothelial keratoplasty (DMEK) tissue layer; and a temporary synthetic stromal scaffold (SSS) coupled to the DMEK tissue layer, wherein the DMEK tissue layer and the SSS have a combined thickness that is no greater than 150 microns.

Embodiment R: The device of Embodiment Q, wherein the SSS prevents spontaneous scrolling of the DMEK tissue layer in an aqueous environment.

Embodiment S: The device of Embodiment Q or Embodiment R, wherein the synthetic stromal scaffold is coupled to a Descemet-membrane-side of the DMEK tissue layer.

Embodiment T: A method of performing Descemet Membrane Endothelial Keratoplasty (DMEK) on a cornea of an eye of a subject using an endothelial keratoplasty device, the endothelial keratoplasty device comprising: a Descemet membrane endothelial tissue layer; and a synthetic scaffold adhered to the Descemet membrane endothelial tissue layer to reduce spontaneous scrolling of the Descemet membrane endothelial tissue layer in an aqueous environment.

Embodiment U: The method of Embodiment T, wherein the DMEK method is performed using a Descemet Stripping Automated Endothelial Keratoplasty (DSAEK) tool.

Embodiment V: The method of Embodiment T or Embodiment U, further comprising injecting a gas into the eye to form a bubble tamponade that holds the endothelial keratoplasty device in apposition against the cornea of the eye.

Embodiment W: The method of any of Embodiments T-V, further comprising dissolving the synthetic scaffold.

Embodiment X: The method of any of Embodiments T-W, further comprising mechanically removing the synthetic scaffold.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as discloses "10 wt. %."

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Pharmaceutically acceptable salts of compounds described herein are within the scope of the present technology and include acid or base addition salts which retain the desired pharmacological activity and is not biologically undesirable (e.g., the salt is not unduly toxic, allergenic, or irritating, and is bioavailable). When the compound of the present technology has a basic group, such as, for example, an amino group, pharmaceutically acceptable salts can be formed with inorganic acids (such as hydrochloric acid, hydroboric acid, nitric acid, sulfuric acid, and phosphoric acid), organic acids (e.g., alginate, formic acid, acetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p toluenesulfonic acid) or acidic amino acids (such as aspartic acid and glutamic acid). When the compound of the present technology has an acidic group, such as for example, a carboxylic acid group, it can form salts with metals, such as alkali and earth alkali metals (e.g., $Na^+$, $Li^+$, $K^+$, $Ca^{2+}$, $Mg^{2+}$, $Zn^{2+}$), ammonia or organic amines (e.g. dicyclohexylamine, trimethylamine, triethylamine, pyridine, picoline, ethanolamine, diethanolamine, triethanolamine) or basic amino acids (e.g., arginine, lysine and ornithine). Such salts can be prepared in situ during isolation and purification of the compounds or by separately reacting the purified compound in its free base or free acid form with a suitable acid or base, respectively, and isolating the salt thus formed.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, ele- ments and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An endothelial keratoplasty device comprising:
   a Descemet membrane endothelial tissue layer; and
   a synthetic scaffold adhered to the Descemet membrane endothelial tissue layer to reduce spontaneous scrolling of the Descemet membrane endothelial tissue layer in an aqueous environment;
   wherein the synthetic scaffold comprises at least two layers, wherein the synthetic scaffold comprises a first layer comprising at least 50% carboxymethylcellulose (CMC), polyethylene glycol (PEG), and/or hyaluronic acid (HA), and a second layer comprising at least 50% HA.

2. The device of claim 1, wherein the synthetic scaffold prevents spontaneous scrolling or otherwise reduces it via adhesion of the synthetic scaffold to the Descemet membrane endothelial tissue layer such that the synthetic scaffold-Descemet membrane endothelial tissue layer complex effectively behaves as a single unit, thereby transferring recoil properties of the synthetic scaffold to the Descemet membrane endothelial tissue layer.

3. The device of claim 1, wherein a surface layer of the synthetic scaffold is biocompatible with corneal endothelial cells.

4. The device of claim 1, wherein the synthetic scaffold has a thickness that is no greater than 150 microns.

5. The device of claim 1, wherein the synthetic scaffold is biochemically dissolvable via at least one of hydrolysis, enzymatic action, or temperature-dependent action.

6. The device of claim 1, wherein the synthetic scaffold comprises a layer adhered to an endothelial-cell-side of the Descemet membrane endothelial tissue layer.

7. The device of claim 1, wherein the synthetic scaffold comprises a layer adhered to a Descemet-membrane-side of the Descemet membrane endothelial tissue layer.

8. The device of claim 1, wherein the first layer of the synthetic scaffold is adhered to an endothelial-cell-side of the Descemet membrane endothelial tissue layer and the second layer of the synthetic scaffold is adhered to a Descemet-membrane-side of the Descemet membrane endothelial tissue layer.

9. The device of claim 1, wherein the first layer comprises CMC and PEG, and wherein the second layer comprises HA.

10. The device of claim 9, wherein the first layer further comprises HA.

11. The device of claim 1, wherein the first layer comprises CMC, PEG, and HA, and wherein the second layer comprises HA.

12. An endothelial keratoplasty device comprising:
    a Descemet membrane endothelial keratoplasty (DMEK) tissue layer; and
    a temporary synthetic stromal scaffold (SSS) coupled to the DMEK tissue layer, wherein the DMEK tissue layer and the SSS have a combined thickness that is no greater than 150 microns;
    wherein the synthetic scaffold comprises a first layer comprising at least 50% carboxymethylcellulose (CMC), polyethylene glycol (PEG), and/or hyaluronic acid (HA), and a second layer comprising at least 50% HA.

13. The device of claim 12, wherein the SSS prevents spontaneous scrolling of the DMEK tissue layer in an aqueous environment.

14. The device of claim 12, wherein the synthetic stromal scaffold is coupled to a Descemet-membrane-side of the DMEK tissue layer.

15. A method of performing Descemet Membrane Endothelial Keratoplasty (DMEK) on a cornea of an eye of a subject using an endothelial keratoplasty device, the endothelial keratoplasty device comprising:
- a Descemet membrane endothelial tissue layer; and
- a synthetic scaffold adhered to the Descemet membrane endothelial tissue layer to reduce spontaneous scrolling of the Descemet membrane endothelial tissue layer in an aqueous environment, wherein the synthetic scaffold comprises a first layer comprising at least 50% carboxymethylcellulose (CMC), polyethylene glycol (PEG), and/or hyaluronic acid (HA), and a second layer comprising at least 50% HA.

16. The method of claim 15, wherein the DMEK method is performed using a Descemet Stripping Automated Endothelial Keratoplasty (DSAEK) tool.

17. The method of claim 15, further comprising injecting a gas into the eye to form a bubble tamponade that holds the endothelial keratoplasty device in apposition against the cornea of the eye.

18. The method of claim 15, further comprising dissolving the synthetic scaffold.

19. The method of claim 15, further comprising mechanically removing the synthetic scaffold.

* * * * *